US012675306B2

(12) United States Patent
Hunfalvay et al.

(10) Patent No.: US 12,675,306 B2
(45) Date of Patent: Jul. 7, 2026

(54) SYSTEMS AND METHODS FOR AUTOMATED CALIBRATION OF AN ASSESSMENT MODEL FOR USER DEVICES

(71) Applicant: RightEye, LLC, Bethesda, MD (US)

(72) Inventors: Melissa Hunfalvay, Bethesda, MD (US); Adam Todd Gross, Bethesda, MD (US); Takumi Bolte, Mooresville, NC (US); Thomas F. Lorenc, New York, NY (US)

(73) Assignee: RightEye, LLC, Bethesda, MD (US)

( * ) Notice: Subject to any disclaimer, the term of this patent is extended or adjusted under 35 U.S.C. 154(b) by 183 days.

(21) Appl. No.: 18/588,400

(22) Filed: Feb. 27, 2024

(65) Prior Publication Data

US 2024/0289147 A1 Aug. 29, 2024

Related U.S. Application Data

(60) Provisional application No. 63/487,523, filed on Feb. 28, 2023.

(51) Int. Cl.
  *G06F 9/451* (2018.01)
  *G06F 9/445* (2018.01)
(52) U.S. Cl.
  CPC .......... *G06F 9/453* (2018.02); *G06F 9/44505* (2013.01)
(58) Field of Classification Search
  CPC ...... G06F 9/543; G06F 9/44505; G06F 3/013; G06N 3/08; G06V 10/82; G06V 40/19
  USPC .......................................... 345/661; 340/575
  See application file for complete search history.

(56) References Cited

U.S. PATENT DOCUMENTS

| | | | | |
|---|---|---|---|---|
| 9,775,512 | B1 * | 10/2017 | Tyler | G06V 40/19 |
| 2014/0148728 | A1 * | 5/2014 | Eizenman | A61B 5/165 |
| | | | | 600/558 |
| 2014/0210625 | A1 * | 7/2014 | Nemat-Nasser | G08B 21/06 |
| | | | | 340/575 |
| 2018/0121608 | A1 * | 5/2018 | Gross | G16H 20/30 |
| 2019/0324532 | A1 | 10/2019 | Aleem et al. | |
| 2020/0364539 | A1 * | 11/2020 | Anisimov | G06N 3/045 |
| 2021/0133509 | A1 * | 5/2021 | Wall | G16H 50/20 |

(Continued)

OTHER PUBLICATIONS

Illahi Gazi Karam et al. Real-time gaze prediction in virtual reality Australasian Computing Education Conference, ACMPUB27, New York, NY, USA, Jun. 14, 2022 (Jun. 14, 2022), pp. 12-18, XP058818101.*

(Continued)

*Primary Examiner* — Prabodh M Dharia
(74) *Attorney, Agent, or Firm* — Bookoff McAndrews, PLLC

(57) ABSTRACT

A method for automatically calibrating an assessment model for a user device may include accessing an automated conversion engine and a first assessment model trained to determine a target assessment result using a set of eye-tracking features data captured at a first sampling rate. Using the automated conversion engine, the set of eye-tracking features data may be input into a time series, the set of eye-tracking features data may be generated at a second sampling rate based on one or more components or processors of the user device, and a calibrated assessment model specific to the user device may be formed using the set of eye-tracking features data at the second sampling rate.

18 Claims, 18 Drawing Sheets

(56) References Cited

U.S. PATENT DOCUMENTS

2025/0130709 A1 * 4/2025 Pasley ................ G06F 3/04842

OTHER PUBLICATIONS

Illahi Gazi Karam et al.: "Real-time gaze prediction in virtual reality" Australasian Computing Education Conference, ACMPUB27, New York, NY, USA, Jun. 14, 2022 (Jun. 14, 2022), pp. 12-18, XP058818101, DOI: 10.1145/3534086.3534331 ISBN: 978-1-4503-8431-5 abstract p. 12-p. 17.
International Search Report and Written Opinion issued in International Application No. PCT/US2024/017413, issued Jun. 17, 2024 (9 pages).

* cited by examiner

200

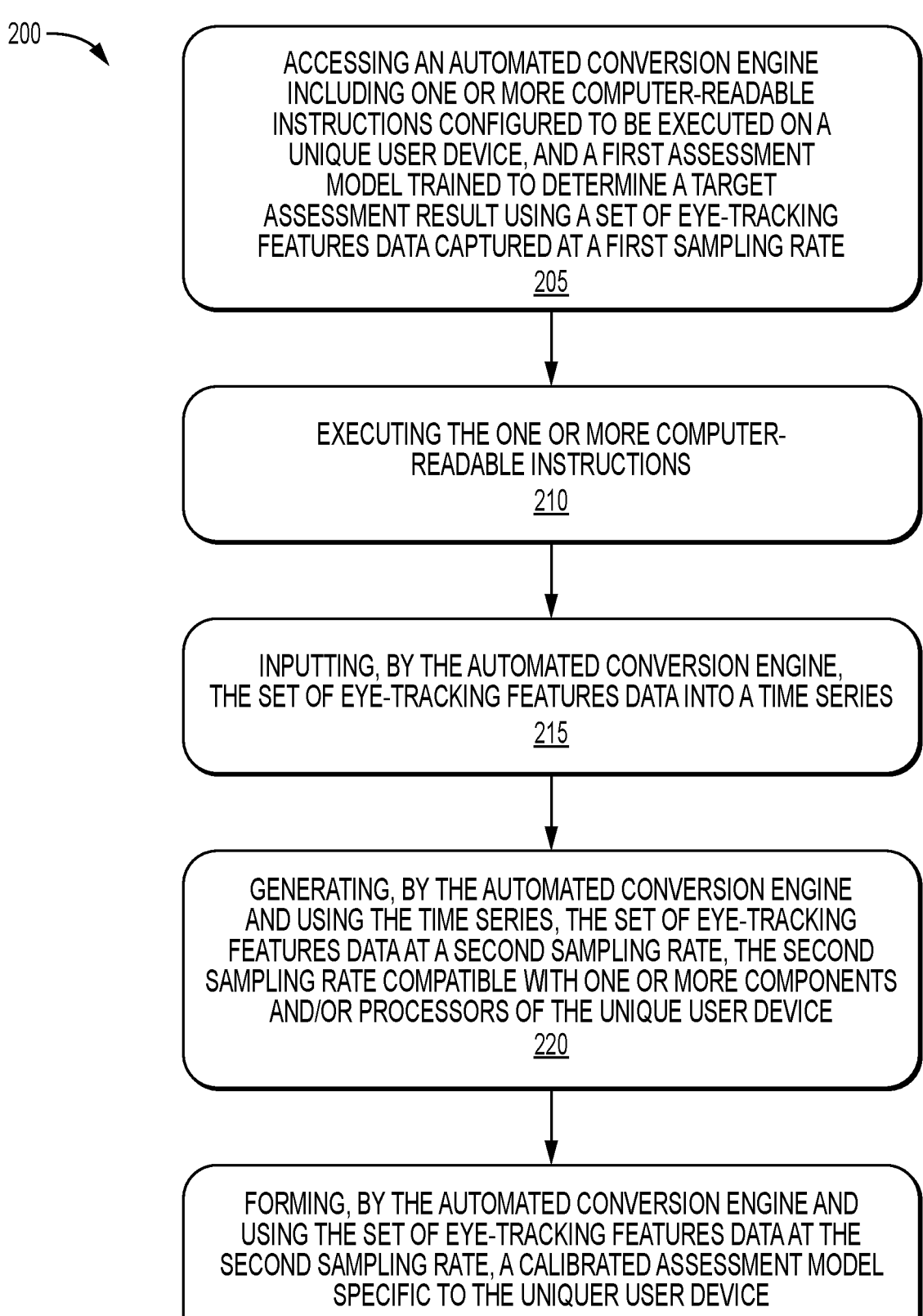

ACCESSING AN AUTOMATED CONVERSION ENGINE
INCLUDING ONE OR MORE COMPUTER-READABLE
INSTRUCTIONS CONFIGURED TO BE EXECUTED ON A
UNIQUE USER DEVICE, AND A FIRST ASSESSMENT
MODEL TRAINED TO DETERMINE A TARGET
ASSESSMENT RESULT USING A SET OF EYE-TRACKING
FEATURES DATA CAPTURED AT A FIRST SAMPLING RATE
205

EXECUTING THE ONE OR MORE COMPUTER-
READABLE INSTRUCTIONS
210

INPUTTING, BY THE AUTOMATED CONVERSION ENGINE,
THE SET OF EYE-TRACKING FEATURES DATA INTO A TIME SERIES
215

GENERATING, BY THE AUTOMATED CONVERSION ENGINE
AND USING THE TIME SERIES, THE SET OF EYE-TRACKING
FEATURES DATA AT A SECOND SAMPLING RATE, THE SECOND
SAMPLING RATE COMPATIBLE WITH ONE OR MORE COMPONENTS
AND/OR PROCESSORS OF THE UNIQUE USER DEVICE
220

FORMING, BY THE AUTOMATED CONVERSION ENGINE AND
USING THE SET OF EYE-TRACKING FEATURES DATA AT THE
SECOND SAMPLING RATE, A CALIBRATED ASSESSMENT MODEL
SPECIFIC TO THE UNIQUER USER DEVICE
225

Figure 3:
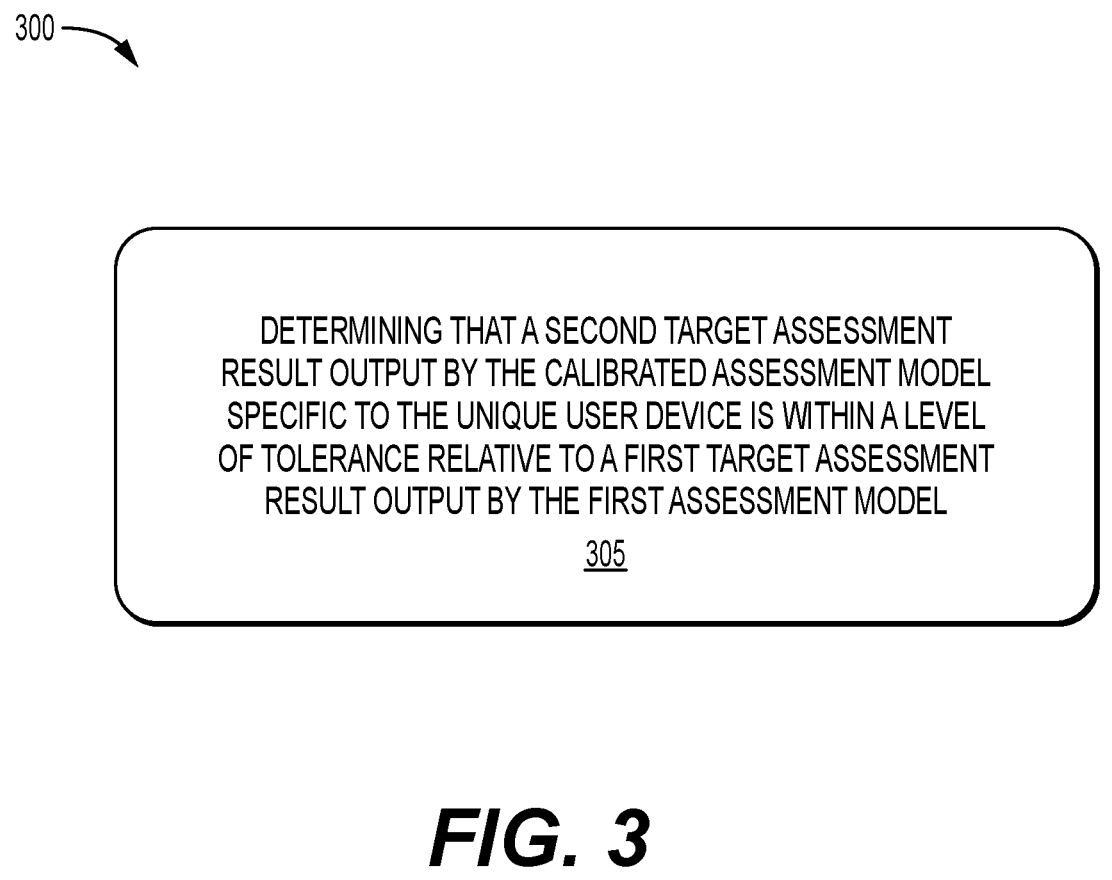

DETERMINING THAT A SECOND TARGET ASSESSMENT
RESULT OUTPUT BY THE CALIBRATED ASSESSMENT MODEL
SPECIFIC TO THE UNIQUE USER DEVICE IS WITHIN A LEVEL
OF TOLERANCE RELATIVE TO A FIRST TARGET ASSESSMENT
RESULT OUTPUT BY THE FIRST ASSESSMENT MODEL

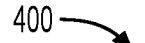

FILTERING THE SET OF EYE-TRACKING FEATURES DATA
CAPTURED AT THE FIRST SAMPLING RATE ACCORDING TO A
PREDETERMINED PORTION OF TIME OF THE ONE OR MORE
PREDETERMINED PORTIONS OF TIME
405

CLASSIFYING THE SET OF EYE-TRACKING FEATURES DATA
ACCORDING TO AN ASSESSMENT TARGET
410

GENERATING A FEATURE METRIC FOR EACH EYE-TRACKING
FEATURE OF THE SET OF EYE-TRACKING FEATURES
DATA USING THE ASSESSMENT TARGET AND THE
PREDETERMINED PORTION OF TIME
415

Figure 5:
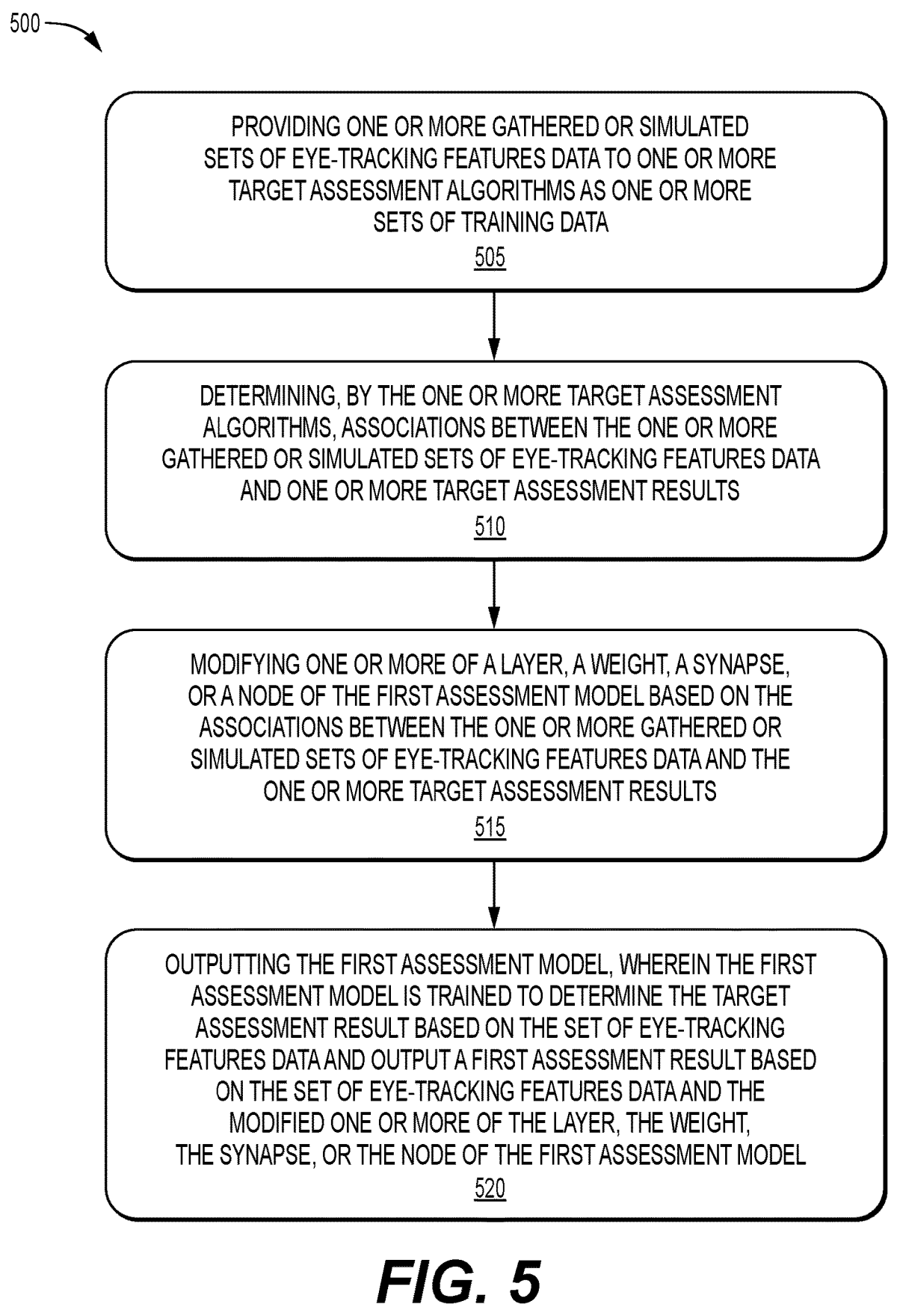

PROVIDING ONE OR MORE GATHERED OR SIMULATED
SETS OF EYE-TRACKING FEATURES DATA TO ONE OR MORE
TARGET ASSESSMENT ALGORITHMS AS ONE OR MORE
SETS OF TRAINING DATA
505

DETERMINING, BY THE ONE OR MORE TARGET ASSESSMENT
ALGORITHMS, ASSOCIATIONS BETWEEN THE ONE OR MORE
GATHERED OR SIMULATED SETS OF EYE-TRACKING FEATURES DATA
AND ONE OR MORE TARGET ASSESSMENT RESULTS
510

MODIFYING ONE OR MORE OF A LAYER, A WEIGHT, A SYNAPSE,
OR A NODE OF THE FIRST ASSESSMENT MODEL BASED ON THE
ASSOCIATIONS BETWEEN THE ONE OR MORE GATHERED OR
SIMULATED SETS OF EYE-TRACKING FEATURES DATA AND THE
ONE OR MORE TARGET ASSESSMENT RESULTS
515

OUTPUTTING THE FIRST ASSESSMENT MODEL, WHEREIN THE FIRST
ASSESSMENT MODEL IS TRAINED TO DETERMINE THE TARGET
ASSESSMENT RESULT BASED ON THE SET OF EYE-TRACKING
FEATURES DATA AND OUTPUT A FIRST ASSESSMENT RESULT BASED
ON THE SET OF EYE-TRACKING FEATURES DATA AND THE
MODIFIED ONE OR MORE OF THE LAYER, THE WEIGHT,
THE SYNAPSE, OR THE NODE OF THE FIRST ASSESSMENT MODEL
520

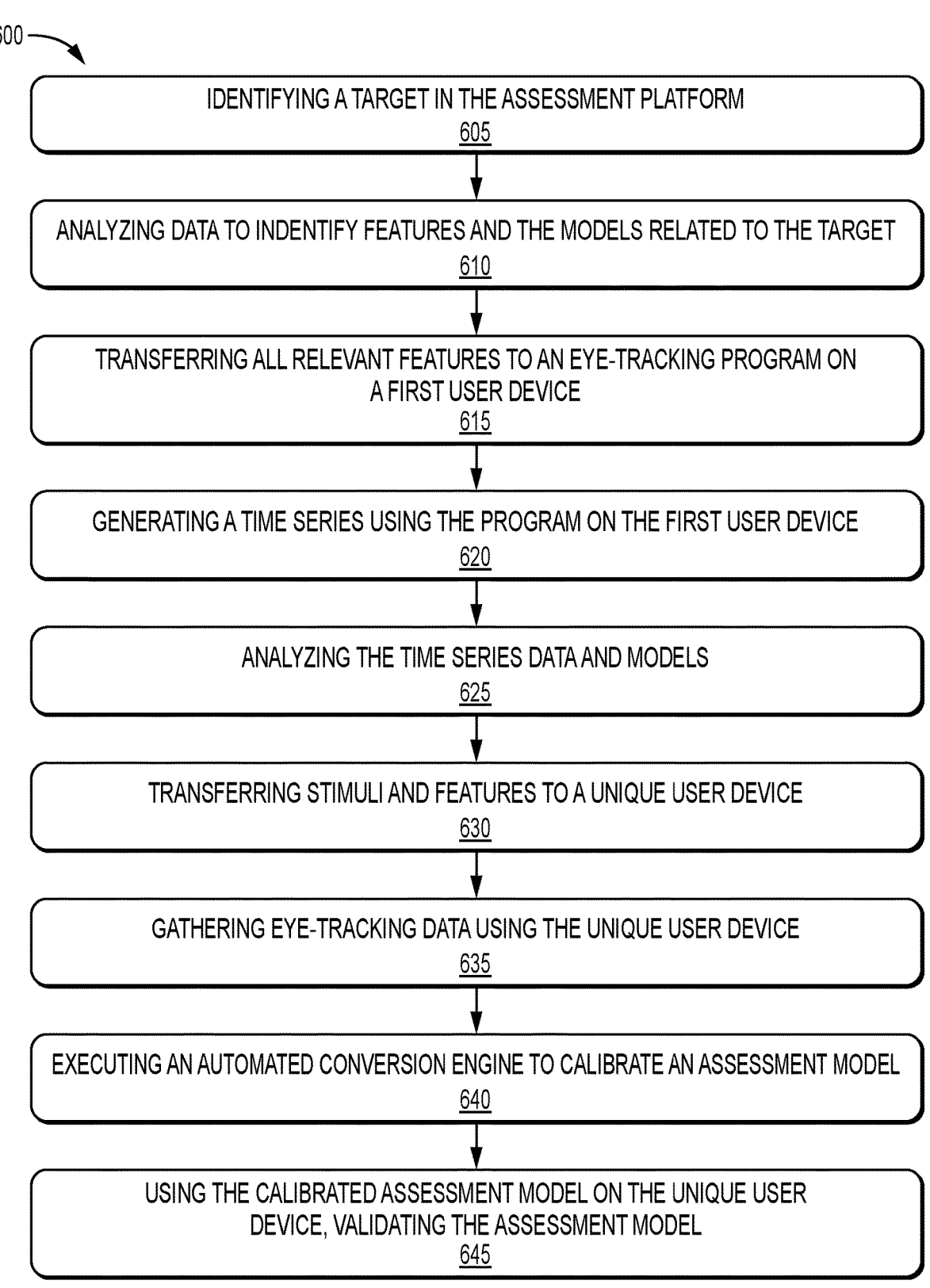

IDENTIFYING A TARGET IN THE ASSESSMENT PLATFORM
605

ANALYZING DATA TO INDENTIFY FEATURES AND THE MODELS RELATED TO THE TARGET
610

TRANSFERRING ALL RELEVANT FEATURES TO AN EYE-TRACKING PROGRAM ON
A FIRST USER DEVICE
615

GENERATING A TIME SERIES USING THE PROGRAM ON THE FIRST USER DEVICE
620

ANALYZING THE TIME SERIES DATA AND MODELS
625

TRANSFERRING STIMULI AND FEATURES TO A UNIQUE USER DEVICE
630

GATHERING EYE-TRACKING DATA USING THE UNIQUE USER DEVICE
635

EXECUTING AN AUTOMATED CONVERSION ENGINE TO CALIBRATE AN ASSESSMENT MODEL
640

USING THE CALIBRATED ASSESSMENT MODEL ON THE UNIQUE USER
DEVICE, VALIDATING THE ASSESSMENT MODEL
645

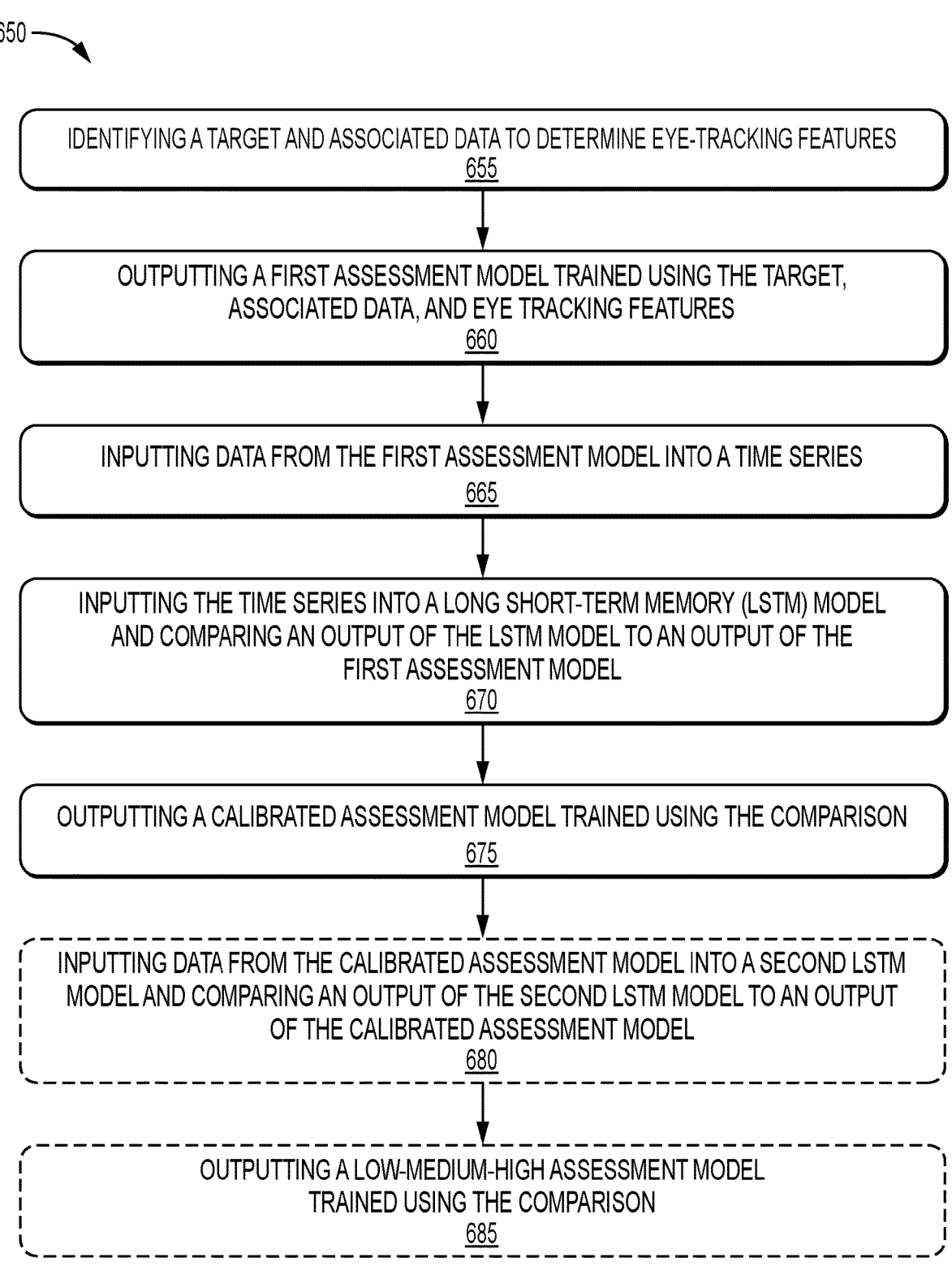

IDENTIFYING A TARGET AND ASSOCIATED DATA TO DETERMINE EYE-TRACKING FEATURES
655

OUTPUTTING A FIRST ASSESSMENT MODEL TRAINED USING THE TARGET, ASSOCIATED DATA, AND EYE TRACKING FEATURES
660

INPUTTING DATA FROM THE FIRST ASSESSMENT MODEL INTO A TIME SERIES
665

INPUTTING THE TIME SERIES INTO A LONG SHORT-TERM MEMORY (LSTM) MODEL AND COMPARING AN OUTPUT OF THE LSTM MODEL TO AN OUTPUT OF THE FIRST ASSESSMENT MODEL
670

OUTPUTTING A CALIBRATED ASSESSMENT MODEL TRAINED USING THE COMPARISON
675

INPUTTING DATA FROM THE CALIBRATED ASSESSMENT MODEL INTO A SECOND LSTM MODEL AND COMPARING AN OUTPUT OF THE SECOND LSTM MODEL TO AN OUTPUT OF THE CALIBRATED ASSESSMENT MODEL
680

OUTPUTTING A LOW-MEDIUM-HIGH ASSESSMENT MODEL TRAINED USING THE COMPARISON
685

SYSTEMS AND METHODS FOR AUTOMATED CALIBRATION OF AN ASSESSMENT MODEL FOR USER DEVICES

TECHNICAL FIELD

Various embodiments of this disclosure relate generally to machine-learning-based and/or artificial intelligence-based techniques for automated calibration, and, more particularly, to systems and methods for automatically calibrating and/or validating an assessment model.

BACKGROUND

Software programs very often rely on or are affected by the components of a hardware device and/or firmware on which the software program is run. For example, particularities of hardware and/or firmware may impact the execution of the software operations or the running of a model, such as a machine-learning and/or artificial intelligence model. Components of the hardware device and/or firmware may be utilized or instructed by the model and/or software program to gather input, process data, and transmit output. In many cases, the hardware device, firmware, and related components may be varied, and therefore may be less compatible or incompatible with the software program or model, especially if the software program or model was developed on or designed for different hardware and/or firmware. This discrepancy may result in inaccurate output, the model and/or software program being incompatible with the hardware and firmware, among other things.

Unless otherwise indicated herein, the materials described in this section are not prior art to the claims in this application and are not admitted to be prior art, or suggestions of the prior art, by inclusion in this section.

SUMMARY OF THE DISCLOSURE

In one aspect, an exemplary embodiment of a computer-implemented method for automatically calibrating an assessment model for a unique user device may include accessing an automated conversion engine. The automated conversion engine may include one or more computer-readable instructions configured to be executed on the unique user device, and a first assessment model. The first assessment model may have been trained to determine a target assessment result using a set of eye-tracking features data captured at a first sampling rate. The method may further include executing the one or more computer-readable instructions that may include inputting the set of eye-tracking features data into a time series. The computer-readable instructions may further include generating, by the automated conversion engine and using the time series, the set of eye-tracking features data at a second sampling rate. The second sampling rate may be based on one or more components or processors of the unique user device. The computer-readable instructions may further include forming, by the automated conversion engine and using the set of eye-tracking features data at the second sampling rate, a calibrated assessment model specific to the unique user device.

In another aspect, an exemplary embodiment of a system for automatically calibrating an assessment model for a unique user device may include a data storage device storing instructions for automatically calibrating the assessment model for the unique user device. The system may further include one or more processors configured to execute the instructions that, when executed by the one or more processors, cause the one or more processors to perform operations. The operations may include accessing an automated conversion engine. The automated conversion engine may include one or more computer-readable instructions configured to be executed on the unique user device, and a first assessment model. The first assessment model may have been trained to determine a target assessment result using a set of eye-tracking features data captured at a first sampling rate. The operations may further include executing the one or more computer-readable instructions that may include inputting the set of eye-tracking features data into a time series. The computer-readable instructions may further include generating, by the automated conversion engine and using the time series, the set of eye-tracking features data at a second sampling rate. The second sampling rate may be based on one or more components or processors of the unique user device. The computer-readable instructions may further include forming, by the automated conversion engine and using the set of eye-tracking features data at the second sampling rate, a calibrated assessment model specific to the unique user device.

In a further aspect, an exemplary embodiment of a non-transitory computer readable medium for automatically calibrating an assessment model for a unique user device may include stored instructions that, when executed by one or more processors of a computing system, cause the one or more processors to perform operations. The operations may include accessing an automated conversion engine. The automated conversion engine may include one or more computer-readable instructions configured to be executed on the unique user device, and a first assessment model. The first assessment model may have been trained to determine a target assessment result using a set of eye-tracking features data captured at a first sampling rate. The operations may further include executing the one or more computer-readable instructions that may include inputting the set of eye-tracking features data into a time series. The computer-readable instructions may further include generating, by the automated conversion engine and using the time series, the set of eye-tracking features data at a second sampling rate. The second sampling rate may be based on one or more components or processors of the unique user device. The computer-readable instructions may further include forming, by the automated conversion engine and using the set of eye-tracking features data at the second sampling rate, a calibrated assessment model specific to the unique user device.

Additional objects and advantages of the disclosed aspects will be set forth in part in the description that follows, and in part will be apparent from the description, or may be learned by practice of the disclosed aspects. The objects and advantages of the disclosed aspects will be realized and attained by means of the elements and combinations particularly pointed out in the appended claims.

It is to be understood that both the foregoing general description and the following detailed description are exemplary and explanatory only and are not restrictive of the disclosed aspects, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed aspects.

FIG. 2 depicts a flowchart of an exemplary method of calibrating an assessment model, according to one or more embodiments.

FIG. 3 depicts a flowchart of an exemplary method of validating an assessment model, according to one or more embodiments.

FIG. 4 depicts a flowchart of an exemplary method of generating a feature metric for an assessment model, according to one or more embodiments.

FIG. 5 depicts a flowchart of an exemplary method of training an assessment model, according to one or more embodiments.

FIG. 6A depicts a flowchart of an exemplary method of building an assessment model and calibrating the assessment model for a new environment, according to one or more embodiments.

FIG. 6B depicts a flowchart of an exemplary method of forming one or more assessments models, according to one or more embodiments.

Figure 1A:
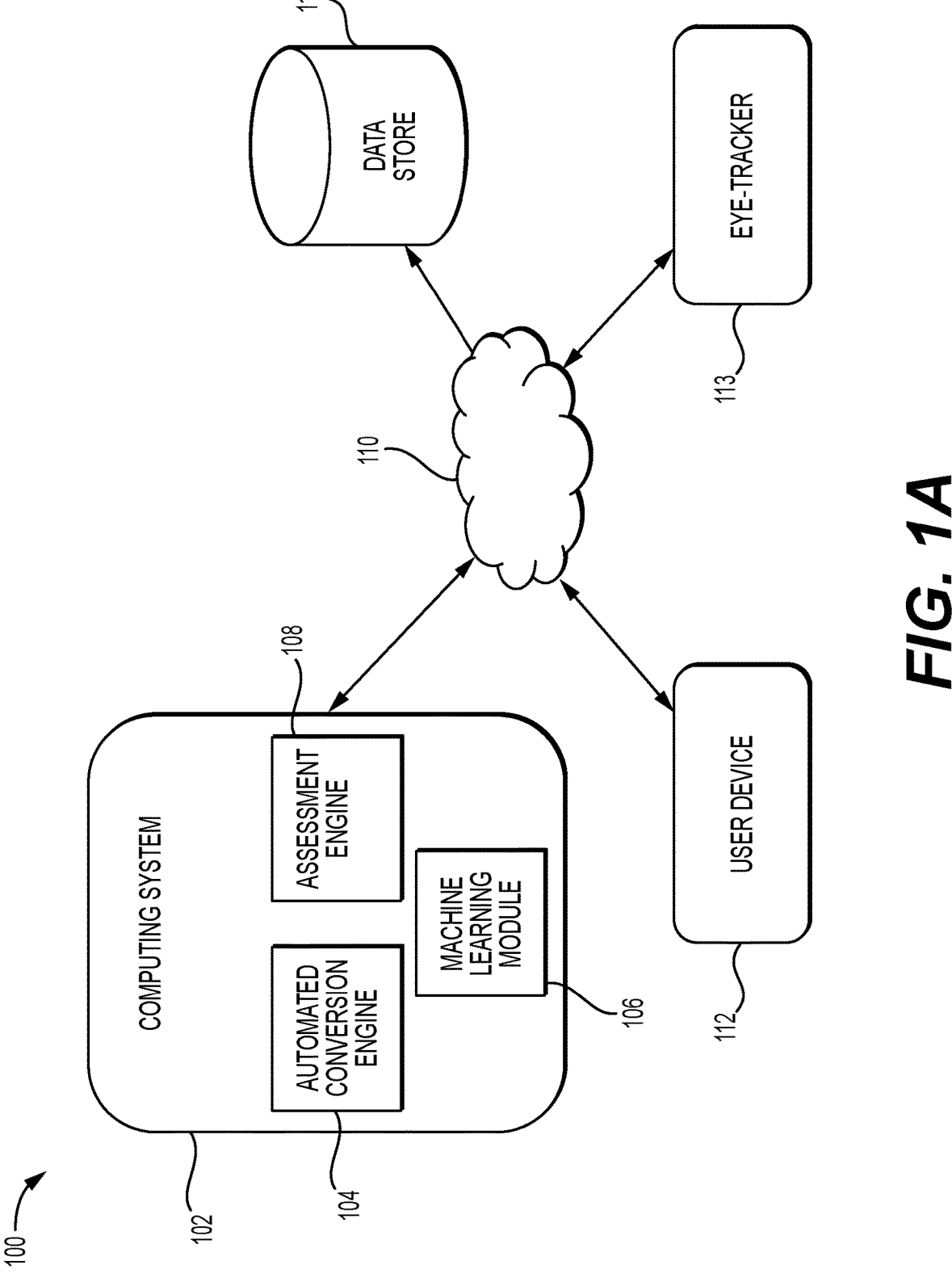
FIG. 1A depicts an exemplary environment for automatically calibrating an assessment model, according to one or more embodiments.

Notably, for simplicity and clarity of illustration, certain aspects of the figures depict the general configuration of the various embodiments. Descriptions and details of well-known features and techniques may be omitted to avoid unnecessarily obscuring other features. Elements in the figures are not necessarily drawn to scale; the dimensions of some features may be exaggerated relative to other elements to improve understanding of the example embodiments.

DETAILED DESCRIPTION OF ASPECTS

Various aspects of the present disclosure relate generally to automatic calibration of software programs and machine-learning models to user devices. Various aspects are directed to various aspects of an engine (e.g., an automated conversion engine) which may facilitate one or more aspects of transferability of algorithms, machine-learning models, and eye-tracking processing platform to various eye trackers and from various eye-tracking signals. In one aspect, the automated conversion engine may be configured to integrate and adapt to any artificial/virtual/extended reality (AR/VR/XR) device that may have eye-tracking capability. The calibration may be initiated or executed using an interaction with the user device, such as a touch of a button (e.g., so that a machine-learning model may be deployed onto any device with an efficient and cost effective integration, configuration & validation process). The automated conversion engine may therefore facilitate multiple device integrations in short periods of time. Further, the automated conversion engine may be configured to enable and/or validate new eye-tracking devices or versions across different hardware specifications (e.g., AR/VR/XR devices), as well as enable and/or validate a model or detection process with different hardware, e.g., to compare and calibrate to a device platform's verified data, (e.g., for determining a target result within a desired degree of accuracy).

At a preparatory stage, a user device platform may include one or more metrics that are associated with one or more stimuli. For example, the platform may be configured to take in eye-tracking data based on specific assessments (e.g., using a visual game). In order to take as input a stream of eye-tracking data that is not necessarily tied to a specific test or assessment, a feature generation service may be configured, calibrated, or generalized so as to be enabled to take in gaze data and output selected metrics (e.g., rather than expecting a specific test and outputting metrics based on that test). In one aspect, machine-learning techniques may be used to process and/or obtain "ground truth" verified data (e.g., data regarding metrics, eye-tracking data, stimuli, and the like).

In various implementations, the automated conversion engine and/or the process of automatically calibrating a model may be a one-time task, such that a configuration of the platform and/or model need not be repeated for similar hardware. The automated conversion engine and/or platform may be configured to receive specification(s) for a new device (e.g., a user device capable of eye-tracking). Examples of such specifications may include Hertz rate, accuracy, or precision. In some embodiments, if one or more specification is unknown, or if verification of manufacture specifications is desired, the automated conversion engine may be configured to calculate or otherwise determine such specifications (e.g., as an output).

Further, the automated conversion engine and/or platform may be configured to receive parameter(s) for acceptability. Examples of parameters may include levels of accuracy, convergent validity, and the like, between the new device and platform results (e.g., expected results of a model). Examples of parameters may also include thresholds of change for interventions based on the results. Additionally, the automated conversion engine and/or platform may be configured to conduct various types of testing on the new device and/or input data files to the automated conversion engine. Examples of testing may include testing minimum thresholds for reliability comparisons and testing minimum threshold for validity comparisons.

At a technical stage, an initial connectivity test for a user device (e.g., a unique user device for which a model may be calibrated) may be performed. The connectivity test may include testing a wireless connectivity (e.g., at 2.4 GHz and/or at 5 GHz), and/or may include testing of peripheral components (controllers, keyboard, mice, keypad, or the like). An eye-tracking signal for the user device may be integrated. For example, a software development kit associated with the user device and/or an eye-tracking signal of the user device may be used (e.g., automatically) to obtain raw gaze signal data. A conversion protocol from the gaze signal data to a standardized gaze data format may be obtained and/or applied. If needed, a further conversion protocol for calibration data of the user device may be similarly obtained and applied. In some embodiments, the connectivity test may be omitted in cases where the user device may be operating in an "offline" environment.

At a validation stage, a validation process may be applied to the user device. For example, specification(s) for other devices and/or aspects of the platform and/or automated conversion engine may be compared with the user device.

Language may be provided or generated (e.g., using a natural language processor and/or large language model "LLM") to indicate differences between devices and/or an impact of different devices or of the differences between the devices on data (e.g., gaze data, and the like). Feature generation configuration of output from the user device may be compared (e.g., validated with results from the platform and/or automated conversion engine).

In various implementations, a reliability process may be applied to the user device. For example, a reliability testing of eye-tracking algorithms may be conducted for the user device. In another example, reliability results of the user device output may be compared to other devices and/or aspects of the platform/automated conversion engine. Additionally, a comparison of algorithms may be applied to the user device. For example, feature generation algorithms, eye-tracking algorithms, and/or machine-learning or artificial intelligence algorithms for the platform/automated conversion engine may be compared (e.g., automatically, to similar algorithms of the user device). Further, various aspects of the user device may be compared to the parameter(s) for acceptability. In response to the comparison being acceptable (e.g., within a threshold range), a deployment process may be performed, as described below. In response to the comparison being unacceptable (e.g., falling outside of the threshold range), one or more of the parameter(s) may be tuned. Such tuning may include, for example, adjusting one or more algorithms or models toward convergence to platform result standards for outputs, or adjusting one or more interventions to convergence to platform result standards for outputs.

A deployment process may include integration of the calibrated model (e.g., a calibrated assessment model) into the software development kit for the user device. In various other implementations, the model may be calibrated using the hardware components of the user device and by accessing the automated conversion engine. Based on an updated feature/metric generation service configuration, a new signal configuration may be integrated into the software and/or software development kit for the user device. The user device may be added to an existing hardware catalogue to specify the user device when using the software development kit. Further, any unique user device may be capable of running the calibrated assessment model subsequent to the model being calibrated for that device by accessing the automated conversion engine by one or more components of the unique user device.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistic regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any combination of supervised or unsupervised techniques or ensemble techniques may also be used. Any suitable type of training may be used, e.g., stochastic, gradient boosted, random seeded, recursive, epoch or batch-based, etc.

While several of the examples herein involve certain types of machine-learning, it should be understood that techniques according to this disclosure may be adapted to any suitable type of machine-learning. Further, while some embodiments and/or examples pertain or refer to machine-learning, it should be understood that any suitable artificial intelligence technique may be used. It should also be understood that the examples above are illustrative only. The techniques and technologies of this disclosure may be adapted to any suitable activity.

While eye-tracking and various aspects relating to eye-tracking and target assessment results related to eye-tracking features are described in the present aspects as illustrative examples, the present aspects are not limited to such examples. For example, the present aspects can be implemented for other types of feature tracking, such as facial recognition, body and/or kinesthetic movements (e.g., head movements), movements of objects (e.g., cars, planes, and the like), or in any other aspects where tracking features, movement, or progression may be measured and/or assessed. Further, the present systems and methods may be applied to methods and systems of automatically calibrating hardware and/or firmware systems (e.g., of user devices) for a software program or model. A software program (e.g., computer-readable instructions) and/or model (e.g., machine-learning model, artificial intelligence model, assessment model, or the like) may therefore become tuned, calibrated, or configured to any particular user device, regardless of operating system, hardware components, version, firmware, model (e.g., model version), and the like.

FIG. 1 depicts an exemplary environment 100 that may be utilized with techniques presented herein. As illustrated, environment 100 may include a computing system 102, a user device 112, a data store 114, an eye-tracker 113, and a network 110 in electronic communication with one or more components of environment 100. Computing system(s) 102 may include an automated conversion engine 104, a machine-learning module 106 (e.g., implementing one or more machine-learning and/or artificial intelligence models), and an assessment engine 108 (e.g., implementing one or more machine-learning and/or artificial intelligence models), as will be described in further detail below. In some embodiments, the automated conversion engine 104, machine-learning module 106, and assessment engine 108 may be separate, stand-alone components of environment 100. One or more user device(s) 112 may communicate across an electronic network 110. The one or more user device(s) 112 may be associated with a user (not shown), e.g., a user utilizing a device capable of eye tracking such as an AR/VR/XR device, an administrator of one or more components of environment 100, and/or the like. As will be discussed in further detail below, one or more computing system(s) 102 may communicate with one or more of the other components of the environment 100 across electronic network 110.

The user device(s) 112 may be configured to enable a user to access and/or interact with other systems in the environment 100. For example, the user device(s) 112 may each be a computer system such as, for example, a desktop computer, a mobile device, a tablet, an augmented/virtual/extended reality (AR/VRXR) device (e.g., a headset, glasses), an automobile and/or heavy machinery (e.g., a car with eye-tracking capability), or the like. In some embodiments, the user device(s) 112 may include one or more electronic application(s), e.g., a program, plugin, browser extension, etc., installed on a memory of the user device(s) 112. In some embodiments, the one or more electronic applications and/or components of environment 100 may be accessed by the user device(s) 112 over electronic network 110 (e.g., such as in a cloud-based environment). In some embodiments, user device(s) 112 may include computing system 102 (e.g., installed on a memory of the user device(s) 112). In some embodiments, the electronic application(s) may be associated with one or more of the other components in the environment 100. For example, the electronic application(s) may include one or more of system control software, system monitoring software, software development tools, etc.

In various embodiments, the environment 100 may include an eye-tracker 113. One or more eye-tracker(s) 113 may communicate across an electronic network 110. The one or more eye-tracker(s) 113 may be associated with a user (not shown), e.g., a user utilizing an AR/VR/XR device that is capable of eye-tracking. In various embodiments, the one or more eye-tracker(s) 113 may encompass any device that is capable of eye-tracking, obtaining an eye-tracking signal, and/or gathering eye-tracking data and/or features, such that position as related to time (e.g., as a vector) may be captured with respect to eye-tracking, bodily movements (e.g., head movements), or the like. In examples, the eye-tracker may be a component of user device 112, computing system 102, or the like. In other examples, eye-tracker 113 may be a standalone component (e.g., a webcam, a medical device, an AR/VR/XR device, or the like).

In various embodiments, the environment 100 may include a data store 114 (e.g., database). The data store 114 may include a server system and/or a data storage system such as computer-readable memory such as a hard drive, flash drive, disk, etc. In some embodiments, the data store 114 includes and/or interacts with an application programming interface for exchanging data to other systems, e.g., one or more of the other components of the environment. The data store 114 may include and/or act as a repository or source for storing the automated conversion engine, eye-tracking data, an assessment model (e.g., a first assessment model), and the like (e.g., a user of user device 112 or any of the other components of environment 100). In some embodiments, the eye-tracking data, and/or other inputs and/or outputs of any of the components of environment 100 may not be retained/stored beyond the processing of the data.

In some embodiments, the components of the environment 100 are associated with a common entity, e.g., a service provider, an account provider, or the like. For example, in some embodiments, computing system 102 and data store 114 may be associated with a common entity. In some embodiments, one or more of the components of the environment is associated with a different entity than another. For example, computing system 102 may be associated with a first entity (e.g., a service provider) while data store 114 may be associated with a second entity (e.g., a storage entity providing storage services to the first entity). The systems and devices of the environment 100 may communicate in any arrangement. As will be discussed herein, systems and/or devices of the environment 100 may communicate in order to one or more of generate, train, or use a machine-learning model and/or artificial intelligence model to process eye-tracking data, among other activities.

As discussed in further detail below, the computing system(s) 102 may one or more of (i) generate, store, train, communicate with, or use a machine-learning model and/or an artificial intelligence model configured to process eye-tracking data and output a target assessment result. As used herein, "machine-learning model" may be used interchangeably with one or more machine-learning and/or artificial intelligence models. The computing system(s) 102 may therefore include a machine-learning model, an artificial intelligence model, and/or instructions associated with the machine-learning model and/or the artificial intelligence model, e.g., instructions for generating a machine-learning model, training the machine-learning model, using the machine-learning model etc. The computing system(s) 102 may include instructions for retrieving data, adjusting data, e.g., based on the output of the machine-learning and/or artificial intelligence model, and/or operating a display of the user device(s) 112 to output the target assessment result, one or more interventions, one or more reports and/or graphical representations of data and/or the target assessment result, or the like, e.g., as adjusted based on the machine-learning and/or artificial intelligence model. The computing system(s) 102 may include training data, e.g., eye-tracking data, and may include ground truth, e.g., (i) training eye-tracking data, (ii) training target assessment results, and (iii) features data to generate the target assessment result.

As depicted in FIG. 1, computing system(s) 102 may include automated conversion engine 104. In various embodiments, automated conversion engine 104 is configured to input a set of eye-tracking features data into a time series, generate the set of eye-tracking features data at a second sampling rate using the time series, and form a calibrated assessment model, as described herein. The automated conversion engine 104 may be accessed by a user device, such as user device 112, and may be downloaded to the user device (e.g., over network 110), may be loaded onto the user device (e.g., in electronic communication with a storage media), may be stored on the user device (e.g., installed in memory of the user device 112), or the like. The automated conversion engine may include computer-readable instructions configured to be executed on the user device (e.g., as a configuration file, or the like).

Computing system(s) 102 may also include machine-learning module 106. In some embodiments, a system or device other than the computing system(s) 102 is used to generate and/or train the machine-learning and/or artificial intelligence model. For example, such a system may include instructions for generating the machine-learning model, the training data and ground truth, and/or instructions for training the machine-learning model. A resulting trained-machine-learning model may then be provided to the computing system(s) 102.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations within eye-tracking data such that the trained machine-learning model is configured to output a target assessment result.

In various embodiments, the variables of a machine-learning model may be interrelated in any suitable arrangement in order to generate the output. For example, in some embodiments, the machine-learning model may include feature processing architecture that is configured to identify, isolate, and/or extract features in eye-tracking data. For example, the machine-learning model may include one or more convolutional neural network ("CNN") configured to identify features in the eye-tracking data, and may include further architecture, e.g., a connected layer, neural network, etc., configured to determine a relationship between the identified features in order to determine an accurate target assessment result.

In some embodiments, the machine-learning model of the computing system 102 may include a Recurrent Neural Network ("RNN"). Generally, RNNs are a class of feed-forward neural networks that may be well adapted to processing a sequence of inputs. In some embodiments, the machine-learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of eye-tracking data as input, and generate a target assessment result.

In some embodiments, a plurality of machine-learning models may be used, e.g., in series, in parallel, and/or in conjunction with each other. For example, an image processing model, e.g., that includes a CNN or the like, may be used in conjunction with a camera or eye tracker or the like to locate a user's gaze to generate eye tracking data, and an LSTM may be used to evaluate such data, e.g., to identify features in the data and/or generate evaluations based on such features.

According to various embodiments, automated conversion engine 104 may include and/or communicate with machine learning module 106 and/or may include an assessment machine learning model (e.g., a first assessment model and/or a calibrated assessment model).

As depicted in FIG. 1, computing system(s) 102 may include assessment engine 108. Assessment engine 108 may include one or more algorithms and/or machine-learning models operable to determine that an assessment result output by a calibrated assessment model is within a level of tolerance. In examples, the tolerance level may be a predetermined acceptable degree of accuracy. In various embodiments, assessment engine 108 may be formed using output from one or more components and/or models described herein. In examples, assessment engine 108 may be formed using the output of an assessment machine-learning and/or artificial intelligence model (e.g., a target assessment result from a first assessment model, a calibrated assessment model, a low-medium-high assessment model, and the like). In some examples, assessment engine 108 may be formed using data such as duration of time spent by a user in a particular activity (e.g., driving an automobile, operating heavy machinery, interacting with visual stimuli using an AR/VR/XR device, and the like), meta data (e.g., logs of events from the user device 112 and/or environment 100), or the resulting output of the processing of data (e.g., a graph, chart, or the like).

As depicted in FIG. 1, environment 100 may also include electronic network 110. In various embodiments, the electronic network 110 may be a wide area network ("WAN"), a local area network ("LAN"), personal area network ("PAN"), or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

Although depicted as separate components in FIG. 1, it should be understood that a component or portion of a component in the environment 100 may, in some embodiments, be integrated with or incorporated into one or more other components. For example, components of computing system 102 may be embodied within an executable file (e.g., a configuration file) or a software program that is accessed, downloaded by, or otherwise integrated onto a user device (e.g., user device 112). In another example, the computing system 102 may be integrated in a data storage system. The data storage system may be configured to communicate and/or receive/send data across electronic network 110 to other components of environment 100. In another example, the computing system 102 may be integrated in user device 112 and/or eye-tracker 113. In some embodiments, operations or aspects of one or more of the components discussed above may be distributed amongst one or more other components. In some embodiments, components and/or portions of components of environment 100, as well as operations or aspects of one or more of the components discussed above may be implemented using one or more edge devices. In this way, the data may be processed remotely by the one or more edge devices (e.g., the user device 112 and/or eye-tracker 113), by a local server, or the like. Any suitable arrangement and/or integration of the various systems and devices of the environment 100 may be used.

Further aspects of the machine-learning model and/or how it may be utilized to process eye-tracking are discussed in further detail in the methods below. Additionally, further aspects of the automated conversion engine and assessment engine and/or how it may be utilized to automatically calibrate and/or validate an assessment model (e.g., the machine-learning model) are discussed in further detail in the methods below. In the following methods, various acts may be described as performed or executed by a component from FIG. 1, such as the computing system 102, the user device 112, or components thereof. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 1B:
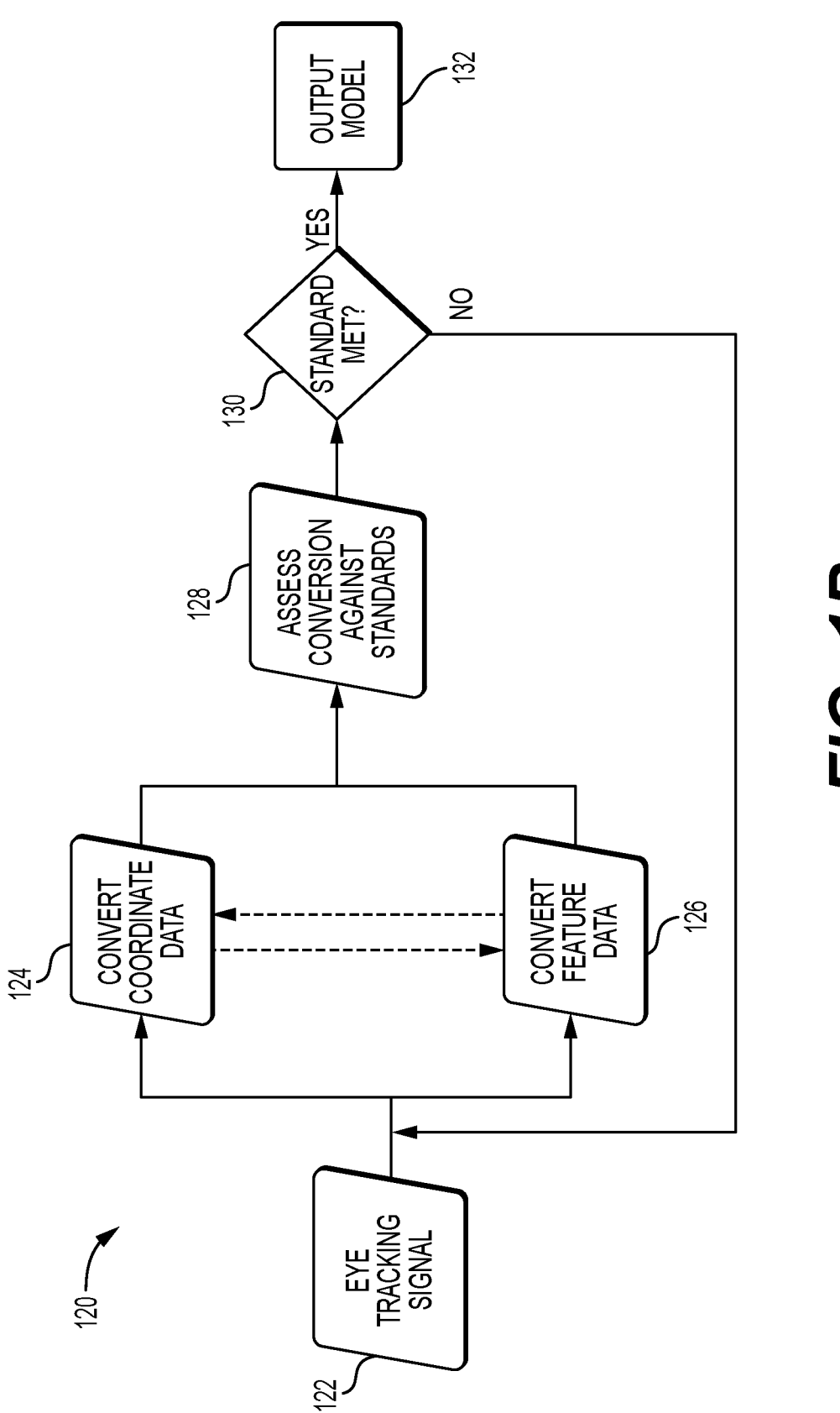
FIG. 1B depicts an exemplary dataflow diagram for automatically calibrating an assessment model, according to one or more embodiments.

FIG. 1B illustrates an exemplary dataflow diagram 120 for automatically calibrating an assessment model. In various embodiments, an eye-tracking signal 122 (e.g., including eye-tracking features data) may be captured and/or gathered by an eye-tracker 113 and/or user device 112. The eye-tracking signal 122 may undergo processing to convert coordinate data 124 and/or to convert feature data 126. In examples, because eye-trackers and/or user devices are not all the same (e.g., hardware components, firmware, and the like), each unique device may produce outputs and/or gather input with varying formats, degrees of accuracy, precision, and/or sampling rates. In examples, this may be problematic as it may not allow a user (e.g. developer, researcher, or the like) to generalize results (e.g., an assessment result) beyond the particular eye-tracker or user device with which they captured and/or processed the data. Further, such disparity may create difficulty in evaluating or comparing not only devices/firmware but also model output generated using different devices/firmware. One benefit of ACE is in mitigating or alleviating this problem by converting all eye tracking signals and features to a common standard and format in order to allow for interoperability. To convert coordinate data 124 and/or convert feature data 126 may therefore adjust the eye tracking signal 122 (e.g., including the eye-tracking features data), to reflect substantially the same output in a differing user device, firmware version or the like.

In various embodiments, the conversion (e.g., of coordinate data and/or feature data) may be assessed against validated data (e.g., ground truth), as will be described in more detail below. If the standard threshold has been met 130, a calibrated assessment model may be output by the system (e.g., computing system 102, automated conversion engine 104, environment 100, or the like).

Figure 1C:
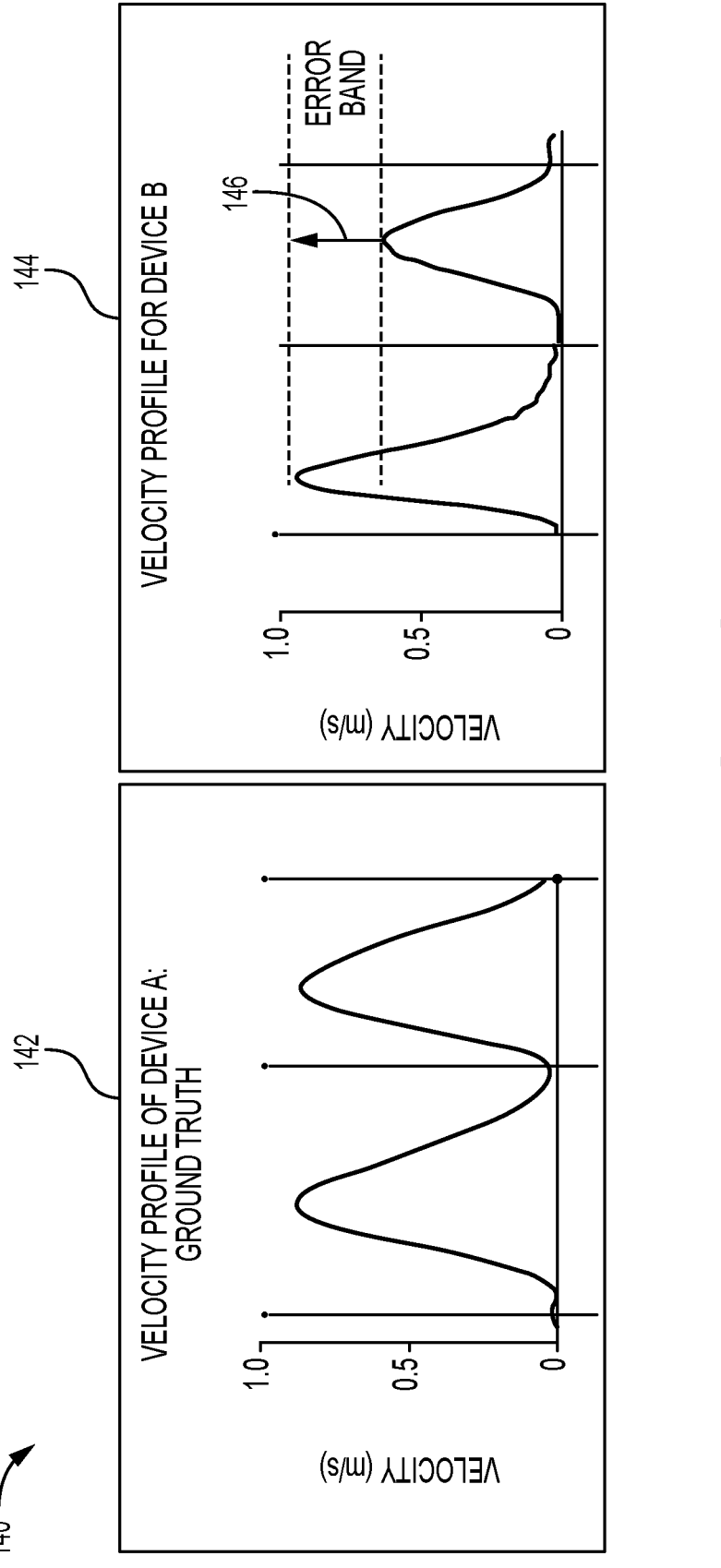
FIG. 1C depicts exemplary graphs illustrating an assessment model calibration using an automated conversion engine, according to one or more embodiments.

FIG. 1C illustrates exemplary graphs 140 illustrating an assessment model calibration using an automated conversion engine. As described with respect to FIG. 1B, coordinate data and feature data (e.g., of an eye-tracking signal) may be converted in order to calibrate an assessment model for a unique user device, and to assess, train or retrain, the calibrated assessment model. In one particular example, a saccade velocity profile may differ from one user device to another. As illustrated, a saccade velocity profile of a first user device 142 may differ from a saccade velocity profile for a second user device 144, creating an error band 146. In other words, eye tracking results may differ due to particularities of the devices/firmware used to capture the eye tracking data. The automated conversion engine, by analyzing such data and the differences therebetween may be configured to determine a predicted effect on output eye tracking data by a particular device, e.g., so that the eye tracking data generated by a particular device may be converted to an equivalent result, and/or a model receiving the eye tracking data may be tuned to provide an accurate result given the particular eccentricities of the particular device. In particular examples, this difference may be accounted for by removing the sample of data that caused the error band 146, normalizing the saccade velocity profile of the second user device 144 (e.g., by increasing the velocity) to meet the saccade velocity profile of the first user device 144, adjusting thresholds or triggers in a model evaluating the saccade profile, or the like. Moreover, while the foregoing example pertains to saccades, such techniques may be applied to any suitable eye tracking feature such as, for example, gaze, gaze velocity, smooth pursuit, fixation, time-to-target, etc., or combinations thereof.

In other examples, eye-tracking techniques common to all eye-tracking capable user devices may be used to calibrate the assessment model. In particular examples, data captured and related to the angle positions of the eye may be used in the following way. If user device A captures an angle position of 500, user device B captures an angle position of 400, and user device C captures an angle position of 700, and the "ground truth" device is determined to be user device A (e.g., output may be conformed to user device A, producing an output of an angle position of 500), the automated conversion engine 104 may convert the data captured by user device B and user device C in the following, respective ways: User device B, 400*1.25=500; User device C, 700*0.714=500. In other words, the automated conversion engine 104 may automatically determine the factor by which the data captured by a unique user device may be multiplied (e.g., and/or adjusted) in order to calibrate the assessment model to the unique aspects of the unique user device. It should be understood that any suitable type of factor may be used. For instance, in some examples, the factor may have one value for a first range of measurements and a second value for a second range of measurements. In some examples, the factor may apply one or more conversion curve or function, e.g., that for an input measurement generates an output converted measurement. In a further example, applying a conversion factor may include applying one or more criteria to an input measurement. As discussed in further detail below, such a conversion factor may be determined in any suitable manner, e.g., algorithmically, via one or more machine-learning technique, via an error-reduction function, etc.

FIG. 2 illustrates an exemplary method 200 of calibrating an assessment model. A first assessment model may have been trained to determine a target assessment result for input eye tracking data. For example, the first assessment model may be trained to determine a user's fatigue level, AAA, BBB, etc., using eye tracking data of the user. The first assessment model may have been trained using a set of eye-tracking features data captured at a first sampling rate. In examples, the set of eye-tracking features may be captured by an interactive interface of a user device (e.g., an AR/VR/XR headset, or the like) at the first sampling rate. In examples, one or more components of the user device may be configured to capture the data at the first sampling rate. At step 205, an automated conversion engine 104 is accessed. In examples, the automated conversion engine 104 may be accessed by a unique user device 112 via a web server in electronic communication with the unique user device 112, or via a download to the unique user device from a storage medium. The automated conversion engine 104 may include one or more computer-readable instructions configured to be executed on the unique user device 112 (e.g., a user device for which a model may be calibrated). The first assessment model may also be accessed or included within the automated conversion engine 104.

At step 210, the one or more computer-readable instructions may be executed (e.g., on the unique user device), such as user device 112 depicted in FIG. 1. At step 215, the set of eye-tracking features data may be input into a time series. This step 215 may be carried out by the automated conversion engine, such as by automated conversion engine 104, as depicted in FIG. 1. At step 220, the automated conversion engine 104, the computing system 102, or the like may generate, e.g., re-generate, the set of eye-tracking features data at a second sampling rate using the time series (e.g., by the automated conversion engine 104). The second sampling rate may be compatible with and/or based on one or more components (e.g., hardware components) and/or processors of the unique user device 112, e.g., as determined automatically and/or manually based on parameters of the unique user device 112. At step 225, a calibrated assessment model specific to the unique user device may be formed using the set of eye-tracking features data at the second sampling rate (e.g., by the automated conversion engine 104). In various embodiments, the automated conversion engine 104, computing system 102, or the like may generate, e.g., regenerate, the set of eye-tracking features data based on one or more particular feature of a unique user device, e.g., a precision of the unique user device, accuracy of the data gathered and/or captured by the unique user device, and/or filters, firmware, environmental changes, and the like that may affect the compatibility of the first assessment model with the unique user device. Therefore, and as described above, the calibrated assessment model specific to the unique user device may be formed based on these aspects.

FIG. 3 illustrates an exemplary method 300 for validating an assessment model. At step 305, it is determined whether a second target assessment result output by the calibrated assessment model specific to the unique user device 112 is within a level of tolerance relative to a first target assessment result output by the first assessment model. In various embodiments, the second target assessment result may be compared to the first target assessment result or to a target assessment result that utilized verified data as input. In various embodiments, the verified data has been verified using medical records, validated scientific surveys, biomarkers, known outcomes, known devices, or the like. In various other embodiments, gathered/and or simulated data may be utilized as input into the calibrated assessment model and as input into the first assessment model. The target assessment results of both models may be then be compared to determine if the output is within the level of tolerance. In examples, the level of tolerance may be an acceptable degree of accuracy. As such, if the first assessment model would output a particular target assessment result, then it would be expected that the second target assessment result output by the calibrated assessment model would be the same.

In various embodiments, should the validating fail (e.g., the comparison is outside of the level of tolerance), the calibrated assessment model may be reformed and/or retrained. In an example of reforming, the automated conversion engine 104 may perform the process of forming the calibrated assessment model anew. In an example of retraining, the assessment engine 108 may utilize verified data and/or gathered and/or simulated data to retrain the calibrated assessment model.

FIG. 4 illustrates an exemplary method 400 for generating a feature metric for an assessment model. At step 405, a set of eye-tracking features captured at a first sampling rate may be filtered according to a predetermined portion of time of one or more predetermined portions of time. At step 410, the set of eye-tracking features data may be classified according to an assessment target. At step 415, a feature metric for each eye-tracking features of the set of eye-tracking features data may be generated using the assessment target and the predetermined portion of time.

FIG. 5 illustrates an exemplary method 500 for training an assessment model. In various implementations, a classification model may trained to identify features that detect a particular target (e.g., fatigue, cognitive overload, and the like). In an exemplary embodiment, the identified features may be utilized as input into the trained assessment model. At step 505, one or more gathered or simulated sets of eye-tracking features data may be provided to one or more target assessment algorithms as one or more sets of training data. At step 510, the one or more target assessment algorithms may determine associations (e.g., using the features identified by the classification model) between the one or more gathered or simulated sets of eye-tracking features data and one or more target assessment results (e.g., fatigue, cognitive overload, and the like).

At step 515, one or more of a layer, a weight, a synapse, or a node of the first assessment model may be modified based on the determined associations between the one or more gathered or simulated sets of eye-tracking features data and the one or more target assessment results. At step 520, the first assessment model may be output (e.g., as a trained machine-learning model). In examples, the output may be a predicted or determined target. The first assessment model may therefore be trained to determine the target assessment result based on the set of eye-tracking features data and output a first assessment result based on the set of eye-tracking features data and the modified one or more of the layer, the weight, the synapse, or the node of the first assessment model. In various implementations, the first assessment model may be retained using one or more first assessment results and the one or more gathered or simulated sets of eye-tracking features data. In various embodiments, the first assessment model (e.g., as output using exemplary method 500) may be a long short-term memory (LSTM) model. In examples, the assessment model implemented as an LSTM model may learn dependencies within the eye-tracking features data, the output assessment results, and the like.

FIG. 6A illustrates a flowchart of an exemplary method 600 of building an assessment model and calibrating the assessment model for a new environment. In various implementations, the new environment may be different hardware (e.g., a unique user device) or a different stimulus (e.g., a different target, eye-tracker, or the like). At step 605, a target is identified in the assessment platform. In examples, the target may be fatigue, cognitive overload, or the like. In examples, verified or standard data may be used to identify the target. The verified data may have been verified using clinical notes, categorizations, or may have been confirmed against independent records (e.g., medical records, or the like). Eye-tracking data may be merged with the verified data to form a complete data set. At step 610, data related to the target may be analyzed to identify features (e.g., eye-tracking features) and models associated with the target. For example, particular eye movements may indicate fatigue, or the like.

At step 615, all features determined to be relevant to the target may be transferred to an eye-tracking program on a first user device. For example, eye-tracking features (e.g., saccades, pursuits, fixations, and the like) may be relevant to a target of fatigue, cognitive overload, and the like. In examples, the eye-tracking program may be configured to track eye features given certain stimuli (e.g., using a game, or the like). At step 620, a time series may be generated using the program on the first user device. In examples, an assessment lasting one minute may be converted into a one second time series format. In other examples, the data may be converted to any predetermined time interval. In various implementations, for each one second portion of time (e.g., 0 to 1, 1 to 2, . . . , 59 to 60), the portion of data associated with that portion of time is filtered and classified to create a feature metric. The result may be an associated metric profile for each second of data within the original one minute dataset. The data may then be merged into a single table to create a time series of metrics across the assessment.

At step 625, the time series and associated assessment models may be analyzed. At step 630, stimuli and features may be transferred to a unique user device (e.g., a new environment). At step 635, eye-tracking data may be gathered using the unique user device. At step 640, an automated conversion engine may be executed to calibrate an assessment model. At step 645, the calibrated assessment model may be used (e.g., run on the unique user device) to validate the calibrated assessment model. The assessment result output by the unique user device may be compared to an assessment result associated with input ground truth data (e.g., to verified data), or to eye-tracking data from a subsequent user device (e.g., blind test).

FIG. 6B illustrates a flowchart of an exemplary method 650 of forming one or more assessments models. In various embodiments, exemplary method 650 may be performed by components of computing system 102, such as automated conversion engine 104, machine-learning module 106, and/or assessment engine 108. At step 655, a target and associated data are identified to determine eye-tracking features. In a particular example, if the target is fatigue, then the associated data may include eye-related features that signify fatigue. In the example, the eye-tracking features may then be determined to include those eye-related features that may be observed and/or measured using eye-tracking (e.g., using eye-tracker 113 as depicted in FIG. 1). For instance, one or more machine-learning classification techniques may compare eye tracking data against predetermined or ground truth fatigue data in order to determine features in the eye tracking data that are indicative of the fatigue data. At step 660, a first assessment model trained using the identified target, associated data, and determined eye-tracking features may be output. In various examples, the first assessment model may therefore be trained to identify the target based on gathered and/or simulated eye-tracking features. At step 665, the output data from the first assessment model may be input into a time series, according to the methods described elsewhere herein. At step 670, the time series may be input into a second model in order to train the second model to generate predictions regarding the identified target. In an example, the second model may include a long short-term (LSTM) model, a recurrent model, a sequence-based model, a transformer, or any other suitable model capable of learning and/or predicting events, trends, patterns, or the like. In an example, the time series data regarding the determined features may be evaluated against subsequent events in the time series, so that the second model is trained to make predictions regarding the target based on preceding features in time series data. The output of the second model may then be compared to an output of the first assessment model (e.g., a comparison of a prediction to occur at a later time Y based on features detected at earlier time X using the second model against a classification of features detected using the first model at time Y) to validate the output of the second model. At step 675, using the comparison and/or validation, a calibrated assessment model may be output.

In various embodiments, at optional step 680, output data of the calibrated assessment model may be input into a third model. The output of the third model may be compared to an output of the calibrated assessment model to validate the output of the third model. In various embodiments, the third model may be configured to identify variations in the identified target. For example, fatigue, rather than just being a binary indicator of true or false, may have gradations or levels, e.g., low, medium or high. The third model may be trained, e.g., based on gradation data, to predict a future time in the time series at which the gradation or level of the target is likely to change, e.g., low fatigue changes to medium, etc. At optional step 685, a low-medium-high assessment model may be output, having been trained using the comparison. In various embodiments, the low-medium-high assessment model may be trained to determine associations between one or more gathered and/or simulated sets of eye-tracking features and one or more target assessment results and output one or more predictions of a target. In an example where the target is fatigue, the prediction of the target may include a determination that the user is not fatigued currently, but that the user will be fatigued within a determined period of time (e.g., based on continuing a current level of activity, or the like).

Figure 7:
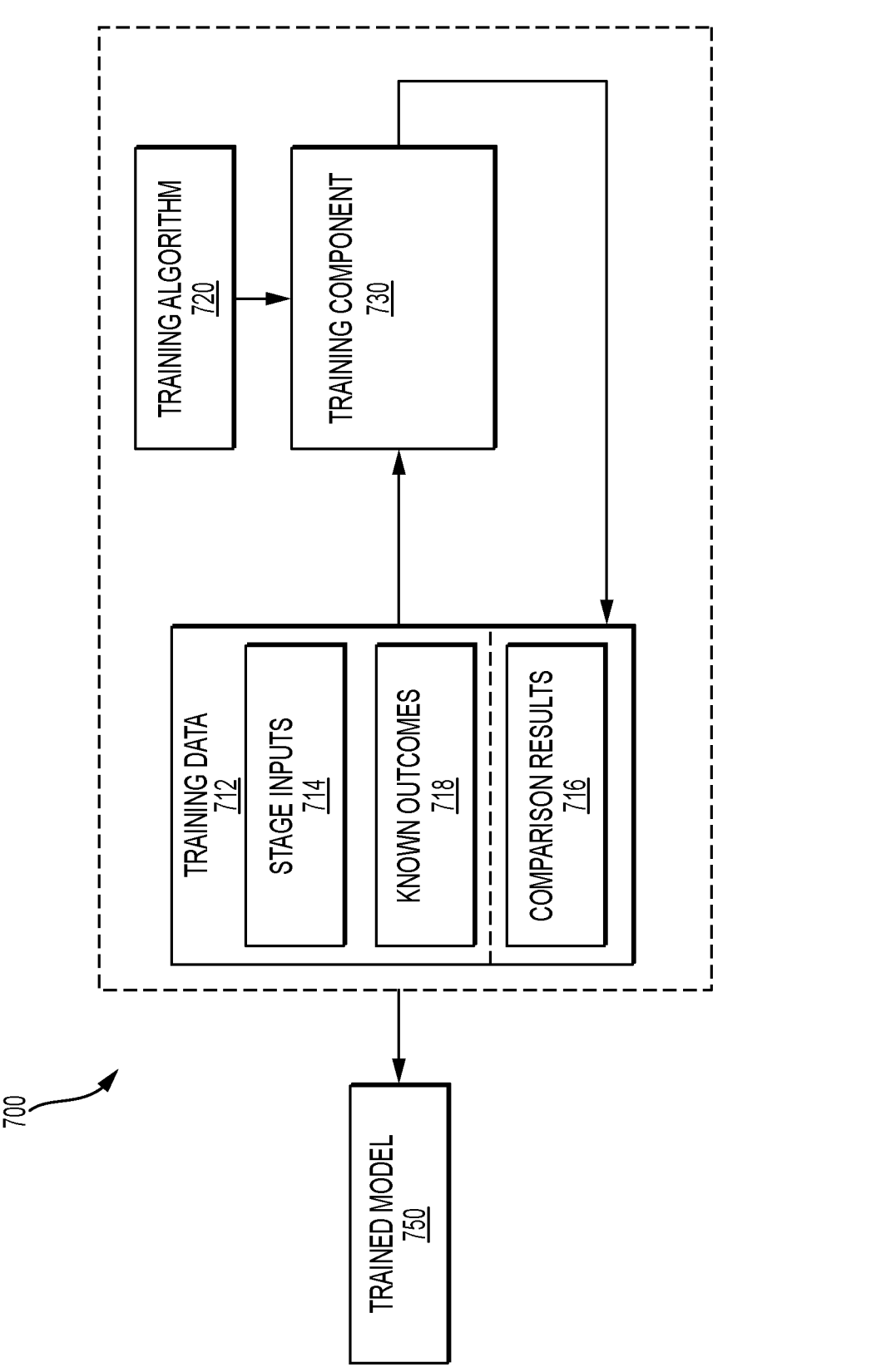
FIG. 7 depicts a flow diagram for training a machine-learning model, according to one or more embodiments.

FIG. 7 depicts a flow diagram for training a machine-learning model. As shown in flow diagram 700 of FIG. 7, training data 712 may include one or more of stage inputs 714 and known outcomes 718 related to a machine-learning model to be trained. The stage inputs 714 may be from any applicable source including a component or set shown in the figures provided herein. The known outcomes 718 may be included for machine-learning models generated based on supervised or semi-supervised training. An unsupervised machine-learning model might not be trained using known outcomes 718. Known outcomes 718 may include known or desired outputs for future inputs similar to or in the same category as stage inputs 714 that do not have corresponding known outputs.

The training data 712 and a training algorithm 720 may be provided to a training component 730 that may apply the training data 712 to the training algorithm 720 to generate a trained machine-learning model 750. According to an implementation, the training component 730 may be provided comparison results 716 that compare a previous output of the corresponding machine-learning model to apply the previous result to re-train the machine-learning model. The comparison results 716 may be used by the training component 730 to update the corresponding machine-learning model. The training algorithm 720 may utilize machine-learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 700 may be a trained machine-learning model 750.

A machine-learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine-learning model (e.g., a trained model) based on the training. Once trained, the machine-learning model may output machine-learning model outputs in accordance with the subject matter disclosed herein. According to an implementation, one or more machine-learning models disclosed herein may continuously update based on feedback associated with use or implementation of the machine-learning model outputs.

It should be understood that aspects in this disclosure are exemplary only, and that other aspects may include various combinations of features from other aspects, as well as additional or fewer features.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

Figure 8:
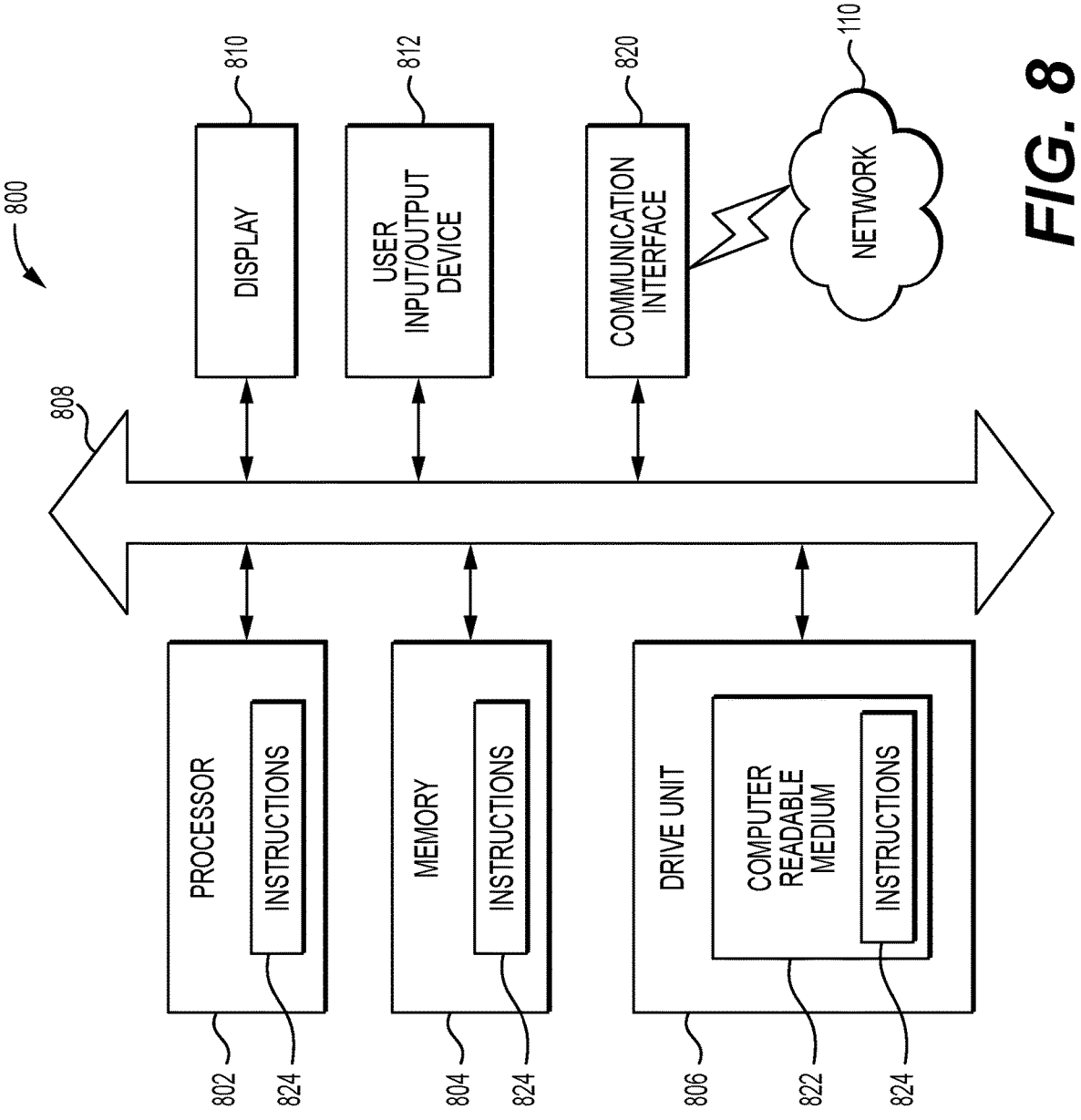
FIG. 8 depicts an example of a computing device, according to one or more embodiments.

FIG. 8 is a simplified functional block diagram of a computer 800 that may be configured as a device for executing the methods disclosed here, according to exemplary aspects of the present disclosure. For example, the computer 800 may be configured as a system according to exemplary aspects of this disclosure. In various aspects, any of the systems herein may be a computer 800 including, for example, a data communication interface 820 for packet data communication. The computer 800 also may include a central processing unit ("CPU") 802, in the form of one or more processors, for executing program instructions. The computer 800 may include an internal communication bus 808, and a storage unit 806 (such as ROM, HDD, SDD, etc.) that may store data on a computer readable medium 822, although the computer 800 may receive programming and data via network communications.

The computer 800 may also have a memory 804 (such as RAM) storing instructions 824 for executing techniques presented herein, for example the systems and methods described with respect to the other Figures, although the instructions 824 may be stored temporarily or permanently within other modules of computer 800 (e.g., processor 802 and/or computer readable medium 822). The computer 800 also may include input and output ports 812 and/or a display 810 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Figure 9A:
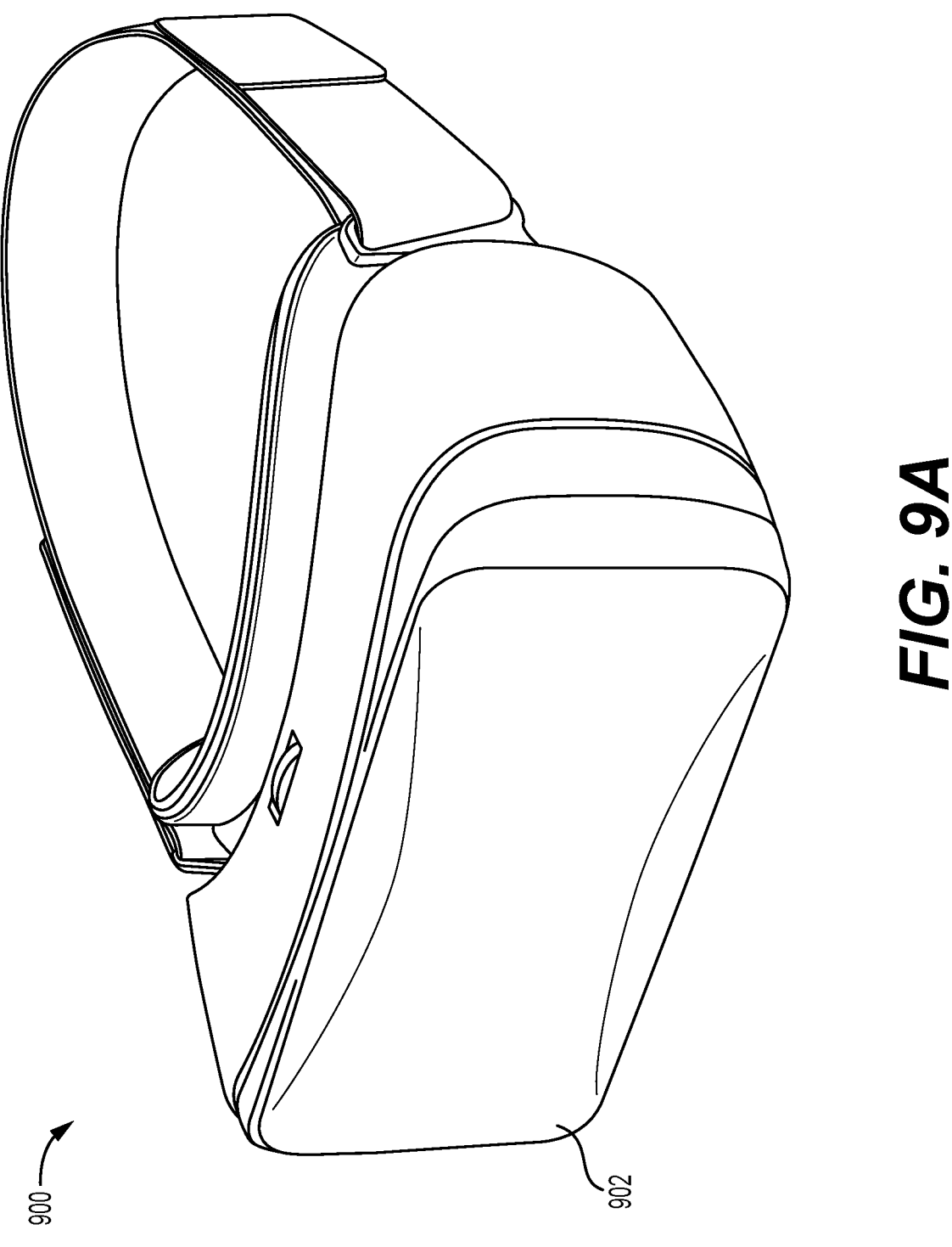
FIGS. 9A-9F depict examples of user devices, according to one or more embodiments.

FIG. 9A illustrates an example of a user device 900 (e.g., a unique user device, such as user device 112, as depicted in FIG. 1). As illustrated, a headset user device 902, such as an AR/VR/XR device, may access an automated conversion engine 104 in order for an assessment model to be calibrated to the headset user device 902, according to the systems and methods described herein.

Figure 9B:
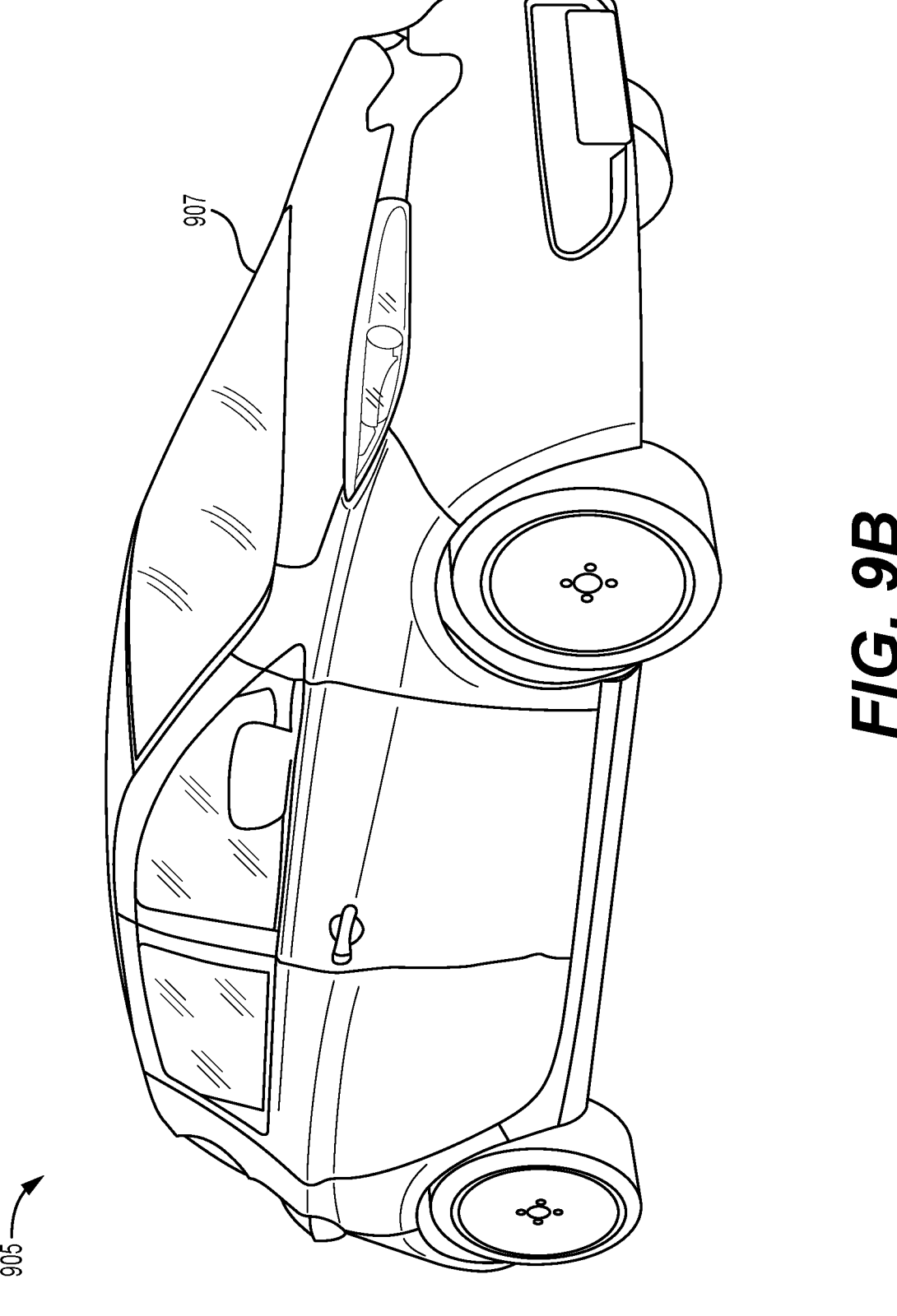

FIG. 9B illustrates another example of a user device 905 (e.g., a unique user device, such as user device 112, as depicted in FIG. 1). As illustrated, an automobile 907, such as an automobile capable of capturing eye-tracking features data, may access an automated conversion engine 104 in order for an assessment model to be calibrated to the automobile 907, according to the systems and methods described herein.

Figure 9C:
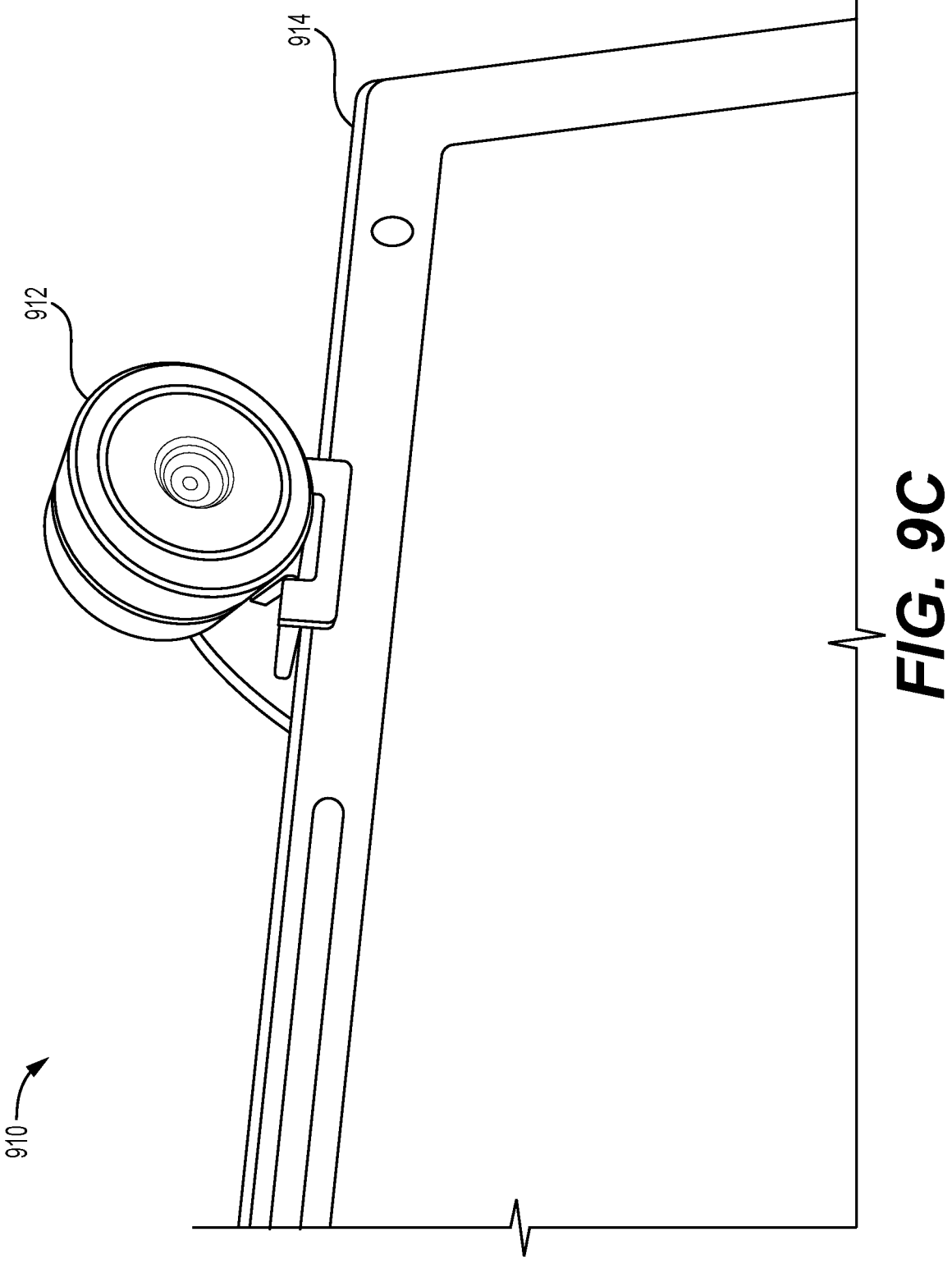
Figure 9D:
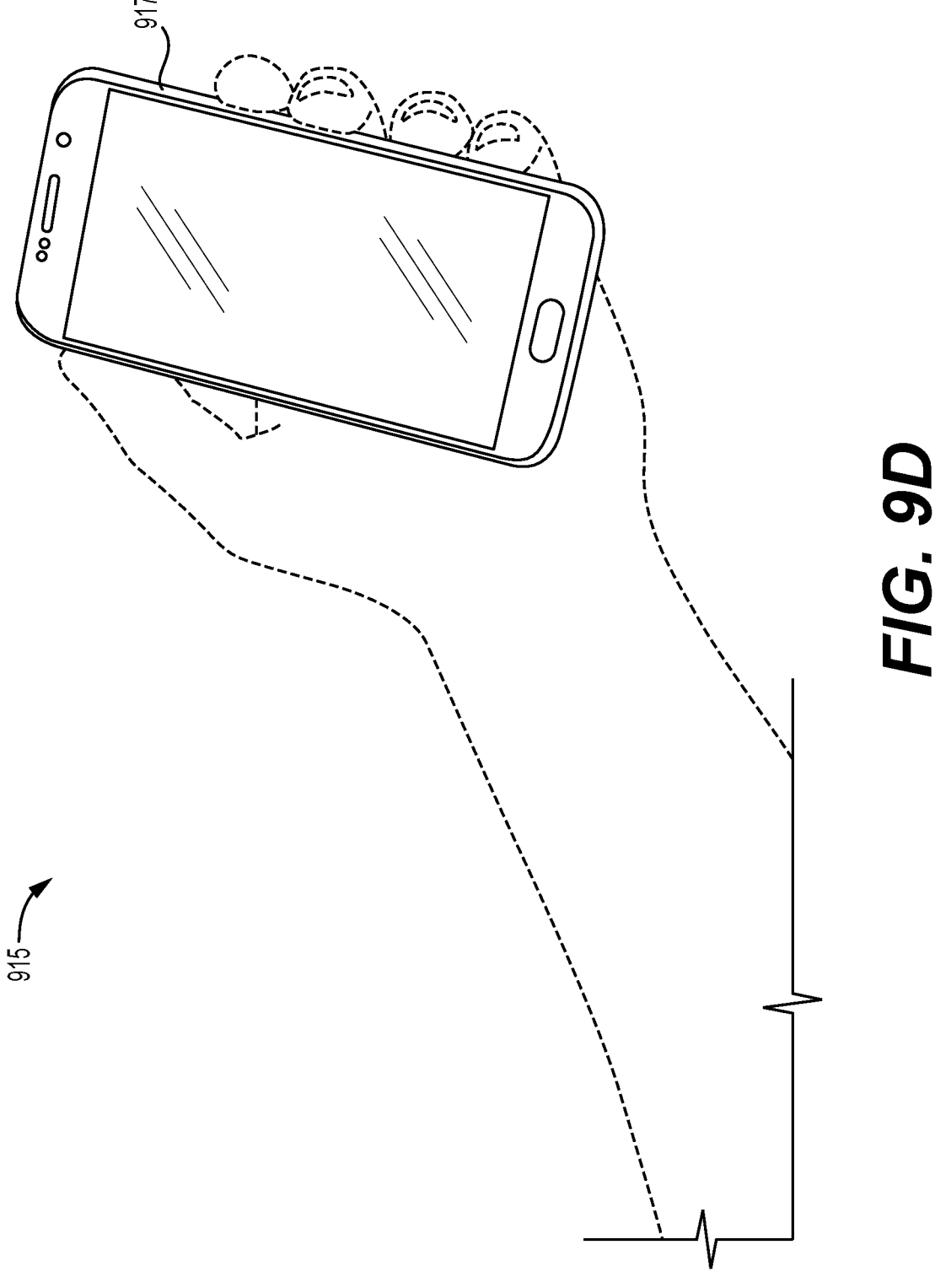

FIG. 9C illustrates another example of a user device 910 (e.g., a unique user device, such as user device 112, as depicted in FIG. 1). As illustrated, a web camera 912 (e.g., webcam), such as a web camera 912 capable of capturing eye-tracking features data may access an automated conversion engine 104 in order for an assessment model to be calibrated to the webcam 912, or to a user device 914 associated with the webcam 912 (e.g., a computer, laptop, mobile device, or the like), according to the systems and methods described herein FIG. 9D illustrates another example of a user device 915 (e.g., a unique user device, such as user device 112, as depicted in FIG. 1). As illustrated, a mobile phone 917 (e.g., mobile device), such as a mobile phone 917 capable of capturing eye-tracking features data may access an automated conversion engine 104 in order for an assessment model to be calibrated to the mobile phone 917, according to the systems and methods described herein.

Figure 9E:
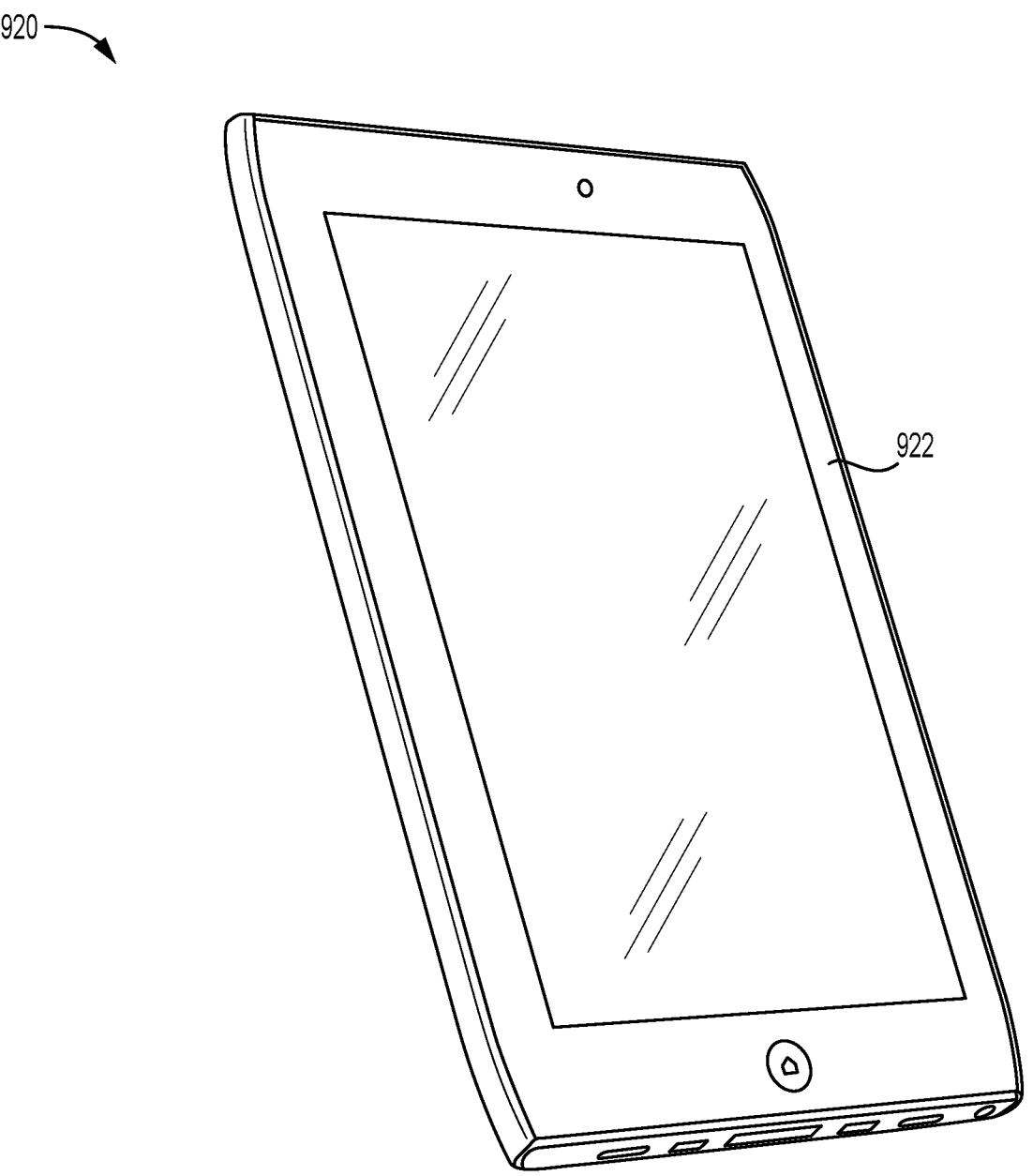

FIG. 9E illustrates another example of a user device 920 (e.g., a unique user device, such as user device 112, as depicted in FIG. 1). As illustrated, a tablet 922 (e.g., mobile device), such as a tablet 922 capable of capturing eye-tracking features data may access an automated conversion engine 104 in order for an assessment model to be calibrated to the tablet 922, according to the systems and methods described herein.

Figure 9F:
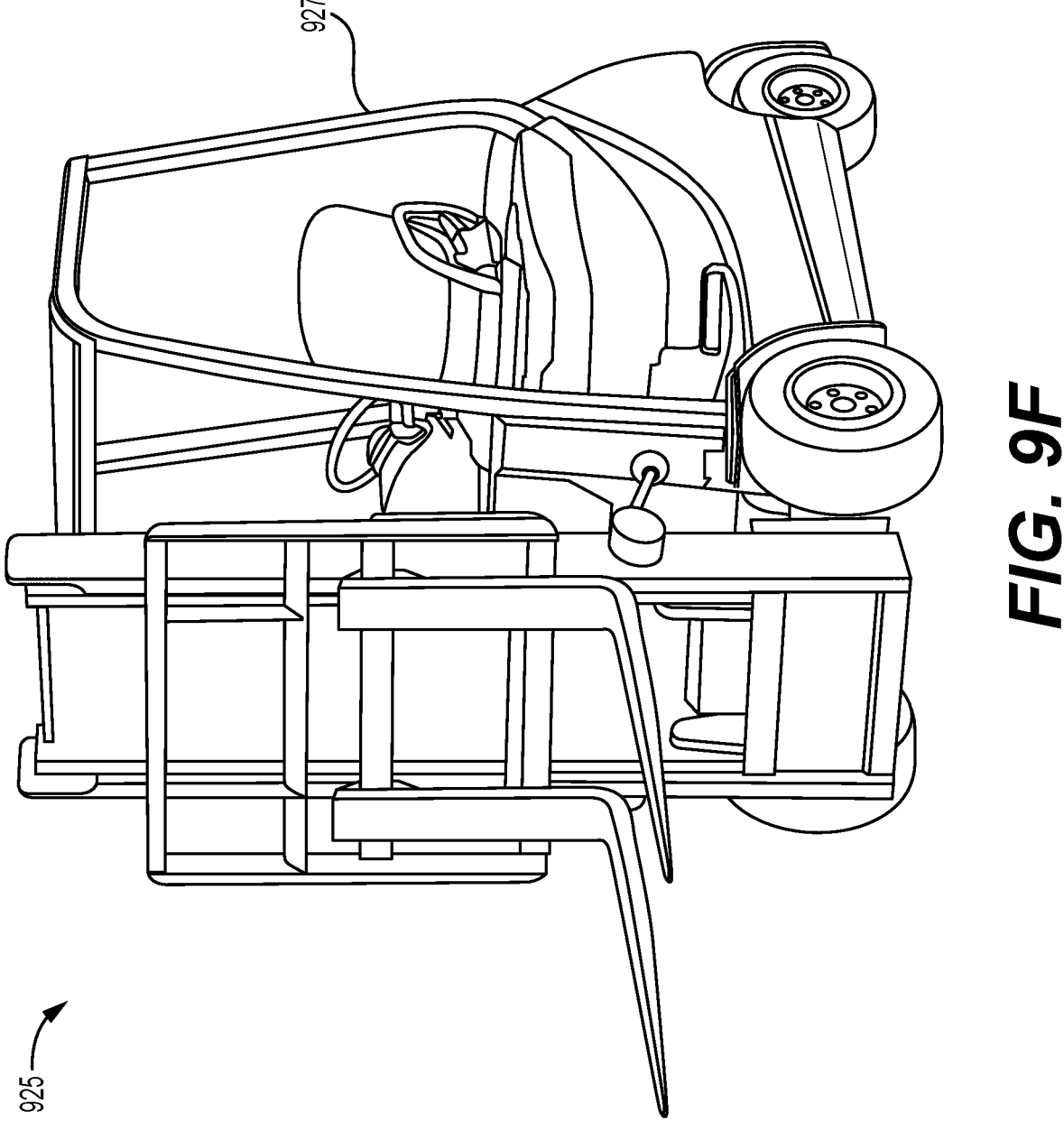

FIG. 9F illustrates another example of a user device 925 (e.g., a unique user device, such as user device 112, as depicted in FIG. 1). As illustrated, a forklift 927 (e.g., or other heavy machinery), such as a forklift 927 capable of capturing eye-tracking features data may access an automated conversion engine 104 in order for an assessment model to be calibrated to the forklift 927, according to the systems and methods described herein.

Figure 9G:
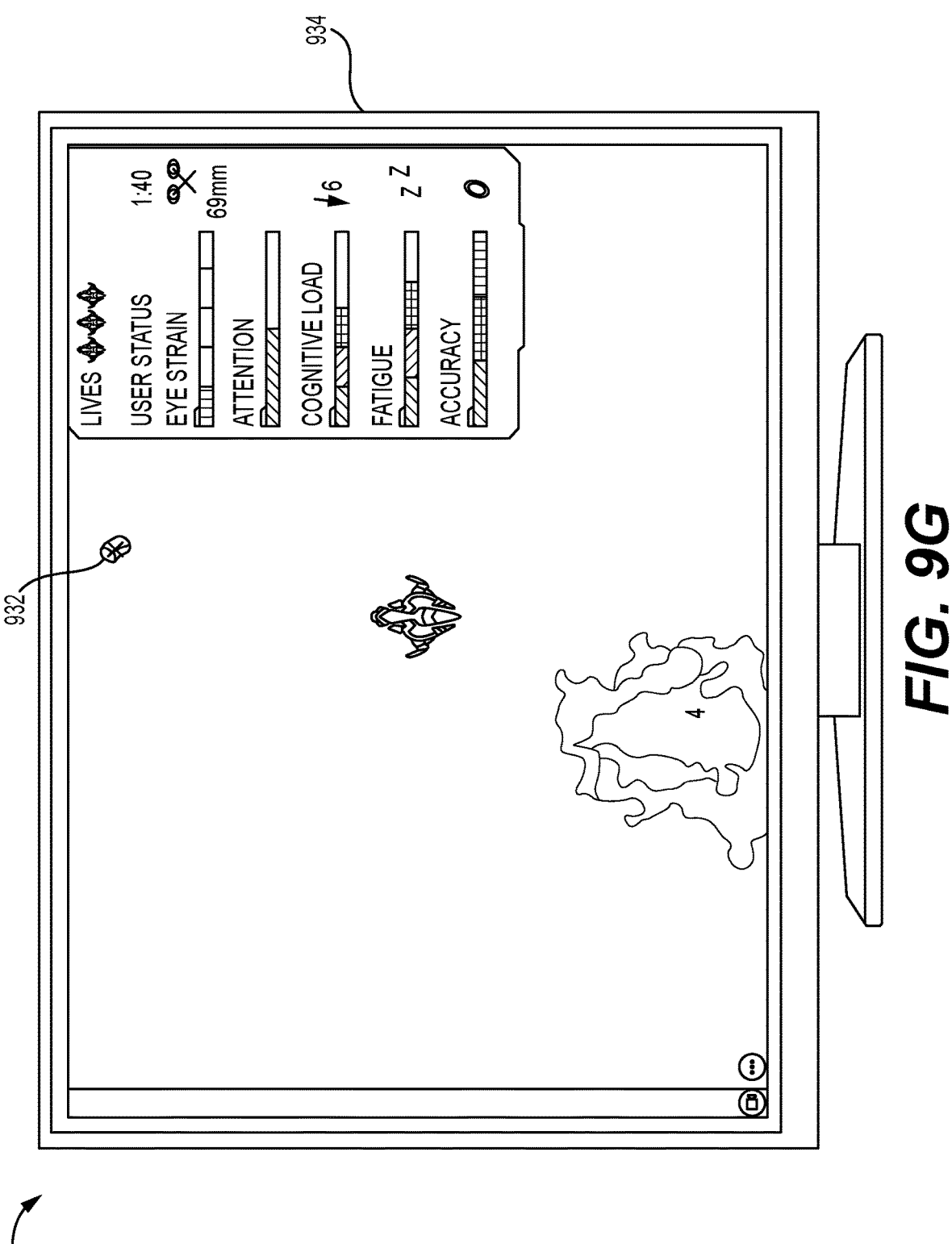
FIG. 9G depicts an example of visual stimuli that may be transmitted to a user device, according to one or more embodiments.

FIG. 9G illustrates an example of visual stimuli 930 that may be transmitted to a user device, such as the user devices described and depicted in FIGS. 9A-9F. The visual stimuli 930 may include one or more interactive elements 932. In various embodiments, the one or more interactive elements 932 may respond to user interaction, such as a user directing their gaze (e.g., looking at, fixating upon) an interactive element of the one or more interactive elements 932. In examples, the one or more interactive elements may appear to respond, e.g., "explode" when a user directs their gaze at an element. In this way, the user may interact with the visual stimuli 930 in a video-game-like experience, using eye gaze to interact with the game elements. In various embodiments, statistics related to the user 934 may also be displayed with the interface or visual stimuli 930. In examples, the statistics related to the user 934 may include graphical representations of any of the inputs and/or outputs from any of the models described herein (e.g., the first assessment model, the calibrated assessment model, the LSTM model, and the like), such as eye-tracking data, targets, target assessment results, and the like. In some embodiments, the visual stimuli 930 may be configured to react or respond to output from one or more of the models. For example, one or more interactive elements 932 may be generated, removed, moved, resized, recolored, retextured, have its behavior modified, etc., in response to the output of a model. For instance, a rise in fatigue may cause a speed of the visual stimuli 930 to slow, may cause a display of the visual stimuli 930 to include material configured to cause less eye fatigue, etc. It should be understood that the foregoing examples are illustrative only, and that any suitable interactive experience may be used.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed aspects may be applicable to any environment, such as a desktop or laptop computer, an automobile entertainment system, a home entertainment system, etc. Also, the disclosed aspects may be applicable to any type of Internet protocol.

It should be appreciated that in the above description of exemplary aspects of the invention, various features of the invention are sometimes grouped together in a single aspect, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed aspect. Thus, the claims following the Detailed Description are hereby expressly incorporated into this Detailed Description, with each claim standing on its own as a separate aspect of this invention.

Furthermore, while some aspects described herein include some but not other features included in other aspects, combinations of features of different aspects are meant to be within the scope of the invention, and form different aspects, as would be understood by those skilled in the art. For example, in the following claims, any of the claimed aspects can be used in any combination.

Thus, while certain aspects have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Operations may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for automatically calibrating an assessment model for a unique user device, the method comprising:

Providing, by one or more processors, an automated conversion engine and a first assessment model for download onto the unique user device, wherein the first assessment model has been trained to determine a target assessment result using a set of eye-tracking features data captured at a first sampling rate, and wherein the automated conversion engine executes one or more computer-readable instructions on the unique user device to calibrate the first assessment model to the unique user device; and executing, by the one or more processors, the one or more computer-readable instructions, comprising:

inputting, by the automated conversion engine, the set of eye-tracking features data into a time series;

generating, by the automated conversion engine and using the time series, the set of eye-tracking features data at a second sampling rate, the second sampling rate based on one or more components or processors of the unique user device; and forming, by the automated conversion engine and using the set of eye-tracking features data at the second sampling rate, a calibrated assessment model specific to the unique user device, wherein the calibrated assessment model is run on the unique user device.

2. The computer-implemented method of claim 1, further comprising:

determining, by one or more processors of an assessment engine, that a second target assessment result output by the calibrated assessment model specific to the unique user device is within a level of tolerance relative to a first target assessment result output by the first assessment model.

3. The computer-implemented method of claim 1, further comprising training the first assessment model, the training comprising:

providing, by one or more processors of a computing system, one or more gathered or simulated sets of eye-tracking features data to one or more target assessment algorithms as one or more sets of training data;

determining, by the one or more target assessment algorithms, associations between the one or more gathered or simulated sets of eye-tracking features data and one or more target assessment results;

modifying one or more of a layer a weight, a synapse, or a node of the first assessment model based on the associations between the one or more gathered or simulated sets of eye-tracking features data and the one or more target assessment results; and outputting, by the one or more processors, the first assessment model, wherein the first assessment model is trained to determine the target assessment result based on the set of eye-tracking features data and output a first assessment result based on the set of eye-tracking features data and the modified one or more of the layer, the weight, the synapse, or the node of the first assessment model.

4. The computer-implemented method of claim 1, wherein the automated conversion engine is accessed by the one or more processors via a web server in electronic communication with the unique user device.

5. The computer-implemented method of claim 1, wherein inputting the set of eye-tracking features data into the time series further comprises:

for each of one or more predetermined portions of time:

filtering, by the automated conversion engine, the set of eye-tracking features data captured at the first sampling rate according to a predetermined portion of time of the one or more predetermined portions of time;

classifying, by the automated conversion engine, the set of eye-tracking features data according to an assessment target; and generating, by the automated conversion engine, a feature metric for each eye-tracking feature of the set of eye-tracking features data using the assessment target and the predetermined portion of time.

6. The computer-implemented method of claim 1, further comprising:

capturing, by an interactive interface of a user device, the set of eye-tracking features data at the first sampling rate.

7. The computer-implemented method of claim 1, wherein the second sampling rate comprises one second intervals.

8. A system for automatically calibrating an assessment model for a unique user device, the system comprising:

a data storage device storing instructions for automatically calibrating the assessment model for the unique user device; and one or more processors configured to execute the instructions that, when executed by the one or more processors, cause the one or more processors to perform operations comprising:

providing, by one or more processors, an automated conversion engine and a first assessment model for download onto the unique user device, wherein the first assessment model has been trained to determine a target assessment result using a set of eye-tracking features data captured at a first sampling rate, and wherein the automated conversion engine executes one or more computer-readable instructions on the unique user device to calibrate the first assessment model to the unique user device; and executing, by the one or more processors, the one or more computer-readable instructions, comprising:

inputting, by the automated conversion engine, the set of eye-tracking features data into a time series;

generating, by the automated conversion engine and using the time series, the set of eye-tracking features data at a second sampling rate, the second sampling rate based on one or more components or processors of the unique user device; and forming, by the automated conversion engine and using the set of eye-tracking features data at the second sampling rate, a calibrated assessment model specific to the unique user device, wherein the calibrated assessment model is run on the unique user device.

9. The system of claim 8, further comprising an assessment engine, wherein the assessment engine is configured to determine that a second target assessment result output by the calibrated assessment model specific to the unique user device is within a level of tolerance relative to a first target assessment result output by the first assessment model.

10. The system of claim 8, wherein the operations further comprise training the first assessment model, the training comprising:

providing, by one or more processors of a computing system, one or more gathered or simulated sets of eye-tracking features data to one or more target assessment algorithms as one or more sets of training data;

determining, by the one or more target assessment algorithms, associations between the one or more gathered or simulated sets of eye-tracking features data and one or more target assessment results;

modifying one or more of a layer a weight, a synapse, or a node of the first assessment model based on the associations between the one or more gathered or simulated sets of eye-tracking features data and the one or more target assessment results; and outputting, by the one or more processors, the first assessment model, wherein the first assessment model is trained to determine the target assessment result based on the set of eye-tracking features data and output a first assessment result based on the set of eye-tracking features data and the modified one or more of the layer, the weight, the synapse, or the node of the first assessment model.

11. The system of claim 8, wherein the automated conversion engine is accessed by the one or more processors via a web server in electronic communication with the unique user device.

12. The system of claim 8, wherein inputting the set of eye-tracking features data into the time series further comprises:

for each of one or more predetermined portions of time:

filtering, by the automated conversion engine, the set of eye-tracking features data captured at the first sampling rate according to a predetermined portion of time of the one or more predetermined portions of time;

classifying, by the automated conversion engine, the set of eye-tracking features data according to an assessment target; and generating, by the automated conversion engine, a feature metric for each eye-tracking feature of the set of eye-tracking features data using the assessment target and the predetermined portion of time.

13. The system of claim 8, wherein the operations further comprise:

capturing, by an interactive interface of a user device, the set of eye-tracking features data at the first sampling rate.

14. The system of claim 8, wherein the second sampling rate comprises one second intervals.

15. A non-transitory computer readable medium for automatically calibrating an assessment model for a unique user device, the non-transitory computer readable medium storing instructions that, when executed by one or more processors of a computing system, cause the one or more processors to perform operations comprising:

Providing, by one or more processors, an automated conversion engine and a first assessment model for download onto the unique user device, wherein the first assessment model has been trained to determine a target assessment result using a set of eye-tracking features data captured at a first sampling rate, and wherein the automated conversion engine executes one or more computer-readable instructions on the unique user device to calibrate the first assessment model to the unique user device; and executing, by the one or more processors, the one or more computer-readable instructions, comprising:

inputting, by the automated conversion engine, the set of eye-tracking features data into a time series;

generating, by the automated conversion engine and using the time series, the set of eye-tracking features data at a second sampling rate, the second sampling rate based on one or more components or processors of the unique user device; and forming, by the automated conversion engine and using the set of eye-tracking features data at the second sampling rate, a calibrated assessment model specific to the unique user device, wherein the calibrated an assessment model is run on the unique user device.

16. The non-transitory computer readable medium of claim 15, wherein the operations further comprise training the first assessment model, the training comprising:

providing, by the one or more processors of the computing system, one or more gathered or simulated sets of eye-tracking features data to one or more target assessment algorithms as one or more sets of training data;

determining, by the one or more target assessment algorithms, associations between the one or more gathered or simulated sets of eye-tracking features data and one or more target assessment results;

modifying one or more of a layer a weight, a synapse, or a node of the first assessment model based on the associations between the one or more gathered or simulated sets of eye-tracking features data and the one or more target assessment results; and outputting, by the one or more processors, the first assessment model, wherein the first assessment model is trained to determine the target assessment result based on the set of eye-tracking features data and output a first assessment result based on the set of eye-tracking features data and the modified one or more of the layer, the weight, the synapse, or the node of the first assessment model.

17. The non-transitory computer readable medium of claim 15, wherein inputting the set of eye-tracking features data into the time series further comprises:

for each of one or more predetermined portions of time:

filtering, by the automated conversion engine, the set of eye-tracking features data captured at the first sampling rate according to a predetermined portion of time of the one or more predetermined portions of time;

classifying, by the automated conversion engine, the set of eye-tracking features data according to an assessment target; and generating, by the automated conversion engine, a feature metric for each eye-tracking feature of the set of eye-tracking features data using the assessment target and the predetermined portion of time.

18. The non-transitory computer readable medium of claim 15, wherein the second sampling rate comprises one second intervals.

* * * * *